US012569838B2

(12) United States Patent
Park et al.

(10) Patent No.: US 12,569,838 B2
(45) Date of Patent: Mar. 10, 2026

(54) TITANIUM-ORGANIC FRAMEWORK PHOTOCATALYST FOR ADSORPTION AND DECOMPOSITION OF VOLATILE ORGANIC COMPOUND, MANUFACTURING METHOD THEREOF AND METHOD FOR REMOVING VOLATILE ORGANIC COMPOUND USING TITANIUM-ORGANIC FRAMEWORK

(71) Applicant: INDUSTRY-ACADEMIC COOPERATION FOUNDATION, YONSEI UNIVERSITY, Seoul (KR)

(72) Inventors: Jong Hyeok Park, Seoul (KR); Jie Jin, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 988 days.

(21) Appl. No.: 17/730,985

(22) Filed: Apr. 27, 2022

(65) Prior Publication Data

US 2022/0347664 A1 Nov. 3, 2022

(30) Foreign Application Priority Data

Apr. 28, 2021 (KR) ........................ 10-2021-0054689

(51) Int. Cl.
*B01J 31/16* (2006.01)
*B01D 53/86* (2006.01)
(Continued)

(52) U.S. Cl.
CPC ...... *B01J 31/1691* (2013.01); *B01D 53/8668* (2013.01); *B01J 35/39* (2024.01);
(Continued)

(58) Field of Classification Search
CPC .................................................. B01J 31/1691
See application file for complete search history.

(56) References Cited

U.S. PATENT DOCUMENTS

2020/0188896 A1* 6/2020 Uribe-Romo ........ B01J 31/2239

FOREIGN PATENT DOCUMENTS

KR 2020-0092793 8/2020

OTHER PUBLICATIONS

Gao et al. "Dicarboxylate Ligands Oriented Assembly of {Ti3(μ3-O)} Units: From Dimer to Coordination Triangles and Rectangles" Inorg. Chem. 2018, 57, 9, 5642-5647 (Year: 2018).*
(Continued)

*Primary Examiner* — Brian W Cohen
*Assistant Examiner* — Nathanael Jason Downes
(74) *Attorney, Agent, or Firm* — DUANE MORRIS LLP; Gregory M. Lefkowitz; Brandon A. Chan

(57) ABSTRACT

The present disclosure relates to a titanium-organic framework photocatalyst for adsorption and decomposition of a volatile organic compound, a method for preparing the same and a method for removing a volatile organic compound using a titanium-organic framework photocatalyst. More specifically, a hierarchical pore structure can be formed and a pore size can be controlled by preparing a titanium-organic framework photocatalyst by coordination bonding a titanium precursor to a mixture of two carboxylic acid compounds having different electronegativity, as organic linkers, at an optimized ratio. The titanium-organic framework photocatalyst exhibits improved efficiency of adsorbing and decomposing a volatile organic compound (VOC) and can improve the photocatalytic degradation rate of the volatile organic compound (VOC).

4 Claims, 31 Drawing Sheets

(51) Int. Cl.

| | |
|---|---|
| *B01J 35/39* | (2024.01) |
| *B01J 35/40* | (2024.01) |
| *B01J 35/50* | (2024.01) |
| *B01J 35/61* | (2024.01) |
| *B01J 35/64* | (2024.01) |
| *B01J 37/04* | (2006.01) |

(52) U.S. Cl.
CPC ............... *B01J 35/40* (2024.01); *B01J 35/50* (2024.01); *B01J 35/615* (2024.01); *B01J 35/617* (2024.01); *B01J 35/643* (2024.01); *B01J 35/647* (2024.01); *B01J 37/04* (2013.01); *B01D 2255/20707* (2013.01); *B01D 2255/705* (2013.01); *B01D 2255/9202* (2013.01); *B01D 2255/9207* (2013.01); *B01D 2257/7027* (2013.01); *B01D 2257/708* (2013.01); *B01J 2235/00* (2024.01); *B01J 2235/05* (2024.01); *B01J 2235/15* (2024.01); *B01J 2235/30* (2024.01); *B01J 2531/46* (2013.01)

(56) References Cited

OTHER PUBLICATIONS

Hendon et. al "Engineering the Optical Response of the Titanium-MIL-125 Metal-Organic Framework through Ligand Functionalization" J. Am. Chem. Soc. 2013, 135, 30, 10942-10945 Supplementary Information (Year: 2013).*

Hendon et. al "Engineering the Optical Response of the Titanium-MIL-125 Metal-Organic Framework through Ligand Functionalization" J. Am. Chem. Soc. 2013, 135, 30, 10942-10945 (Year: 2013).*

Hu et al. "Effects of Monocarboxylic Acid Additives on Synthesizing Metal-Organic Framework NH2-MIL-125 with Controllable Size and Morphology" Cryst. Growth Des. 2017, 17, 12, 6586-6595 (Year: 2017).*

Hu et al. "Effects of Monocarboxylic Acid Additives on Synthesizing Metal-Organic Framework NH2-MIL-125 with Controllable Size and Morphology" Cryst. Growth Des. 2017, 17, 12, 6586-6595 Supplementary Information (Year: 2017).*

V. Muelas-Ramos, M.J. Sampaio, C.G. Silva, J. Bedia, J.J. Rodriguez, J.L. Faria, C. Belver, "Degradation of diclofenac in water under LED irradiation using combined g-C3N4/NH2-MIL-125 photocatalysts" Journal of Hazardous Materials, 2021, 416, 126199 (Year: 2021).*

He, Yilei, et al., "Ti-MOF Derived N-Doped TiO2 Nanostructure as Visible-light-driven Photocatalyst," Chem. Res. Chin. Univ. 36, 447-452 (2020).

* cited by examiner

Ti-MOF-1 precursor

TITANIUM-ORGANIC FRAMEWORK PHOTOCATALYST FOR ADSORPTION AND DECOMPOSITION OF VOLATILE ORGANIC COMPOUND, MANUFACTURING METHOD THEREOF AND METHOD FOR REMOVING VOLATILE ORGANIC COMPOUND USING TITANIUM-ORGANIC FRAMEWORK

CROSS-REFERENCE TO RELATED APPLICATION

This application claims priority to Korean Patent Application No. 10-2021-0054689 filed on Apr. 28, 2021, and all the benefits accruing therefrom under 35 U.S.C. § 119, the contents of which in its entirety are herein incorporated by reference.

BACKGROUND

1. Field

The present disclosure relates to a titanium-organic framework photocatalyst for adsorption and decomposition of a volatile organic compound, a method for preparing the same and a method for removing a volatile organic compound using the titanium-organic framework photocatalyst.

2. Description of the Related Art

Metal-organic frameworks (MOFs) consisting of an inorganic metal ion/cluster and an organic linker have been considered as one of the most attractive porous materials owing to designable framework topology, large surface area and tunable bandgap structure. However, despite the usefulness for important applications such as gas adsorption, energy storage and heterogeneous catalysis, its intrinsic microporous nature (pore size smaller than 2 nm) significantly limits the dynamics of mass diffusion and the accessibility of active sites.

In general, the design of the framework topology structure or defect introduction has been suggested to be responsible for tuning the pore size distribution, thereby improving performance in various applications. In practice, several strategies including solvent-assisted ligand exchange approach, modulation of modulation of cation valence, templating methods, linker thermolysis and use of capping agents have been used to construct MOFs having hierarchical pore structures.

However, these methods generally have problems such as limited pore size distribution and introduction of impurities and require additional post-treatment processes such as template removal, acid etching and high-temperature annealing. Accordingly, it is important to form a hierarchically porous MOF having an customized pore size through a simple process under a relatively appropriate process condition.

Most of the existing methods for controlling the formation of a hierarchically porous MOF focus on the crystal growth phase, topology structure designing or reaction conditions. However, the approaches referring to nucleation rate by controlling of organic linkers have been hardly tried due to random variation and difficulty in expectation.

REFERENCES OF THE RELATED ART

Patent Documents (Patent document 1) Korean Patent Publication No. 2020-0092793.

SUMMARY

The present disclosure is directed to providing a method for preparing a titanium-organic framework photocatalyst for adsorption and decomposition of a volatile organic compound, having a hierarchical pore structure, by mixing two carboxylic acid compounds having different electronegativity as organic linkers at an optimized ratio.

The present disclosure is also directed to providing a titanium-organic framework photocatalyst for adsorption and decomposition of a volatile organic compound, which exhibits superior efficiency of removing a volatile organic compound and improved photocatalytic degradation rate.

The present disclosure is also directed to providing an apparatus for adsorption and decomposition of a volatile organic compound, which includes the titanium-organic framework photocatalyst.

The present disclosure is also directed to providing a method for removing a volatile organic compound using the titanium-organic framework photocatalyst.

The present disclosure provides a method for preparing a titanium-organic framework photocatalyst for adsorption and decomposition of a volatile organic compound, which includes: a step of preparing a mixture solution by mixing a first carboxylic acid compound and a second carboxylic acid compound in an organic solvent; a step of preparing a reactant by mixing a titanium precursor in the mixture solution; and a step of preparing a titanium-organic framework photocatalyst by reacting the reactant at 130-180° C. for 18-30 hours, wherein the first carboxylic acid compound and the second carboxylic acid compound are mixed at a molar ratio of 4:1-1:4 in the mixture solution.

The present disclosure also provides a titanium-organic framework photocatalyst for adsorption and decomposition of a volatile organic compound, wherein the titanium-organic framework photocatalyst has the same crystal structure as the crystal structure of MIL-125 wherein a titanium ion and a mixture of a first carboxylic acid compound and a second carboxylic acid compound are coordination bonded these carboxylic acid compound have the difference in electronegativity, resulting in a competitive nucleation rate with Ti ions. And the mixture is a mixture of the first carboxylic acid compound and the second carboxylic acid compound at a molar ratio of 4:1-1:4.

The present disclosure also provides an apparatus for adsorption and decomposition of a volatile organic compound, which includes the titanium-organic framework photocatalyst.

The present disclosure also provides a method for removing a volatile organic compound using a titanium-organic framework photocatalyst, which includes: a step of preparing a titanium-organic framework photocatalyst by the method described above; a step of adsorbing a volatile organic compound comprised in a waste gas at a concentration of 1-3,000 ppm using the photocatalyst; and a step of decomposing the volatile organic compound adsorbed on the photocatalyst by irradiating light to the photocatalyst with the volatile organic compound adsorbed.

The titanium-organic framework photocatalyst according to the present disclosure, wherein titanium precursor nucleated to a mixture of two carboxylic acid compounds with different coordination rate because these organic linkers having different electronegativity. As a results, a missing-linker defect dominated hierarchical pore structure created in the titanium-organic framework because the carboxylic acid compounds with slower coordination rate can be adsorbed into the cavity of the primary particle that created by the carboxylic acid compounds with faster coordination rate.

In addition, the titanium-organic framework photocatalyst of the present disclosure is advantageous in that pore size can be controlled by adjusting the mixing ratio of the carboxylic acid compounds and superior ability of removing a volatile organic compound (VOC) can be achieved as the efficiency of adsorption and decomposition of the VOC are improved. In addition, the photocatalytic degradation rate of the VOC can be improved due to superior charge separation capability.

The effects of the present disclosure are not limited to those described above. It should be understood that the effects of the present disclosure include all the effects that can be deduced from the following description.

DETAILED DESCRIPTION

Figure 1:
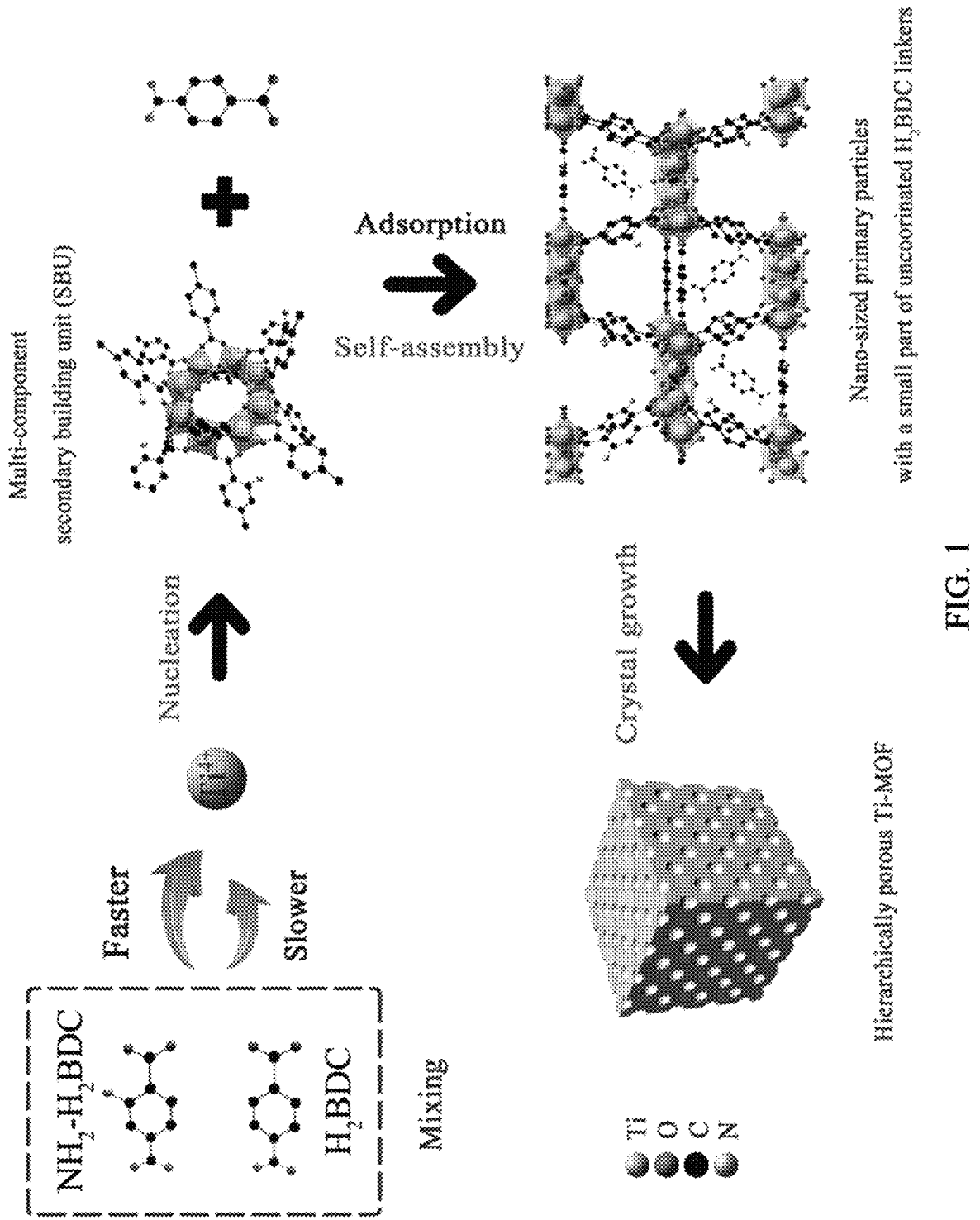
FIG. 1 schematically shows the mechanism of a titanium-organic framework photocatalyst (Ti-MOF) having a hierarchical pore structure according to the present disclosure.

Hereinafter, exemplary embodiments of the present disclosure will be described in more detail.

The present disclosure relates to a titanium-organic framework photocatalyst for adsorption and decomposition of a volatile organic compound, a method for preparing the same, and a method for removing a volatile organic compound using a titanium-organic framework photocatalyst.

The titanium-organic framework photocatalyst according to the present disclosure, wherein a titanium ions are coordination bonded to a mixture of two carboxylic acid compounds, which are organic linkers having different electronegativity, at an optimized ratio, may create a hierarchical pore structure due to the competitive coordination bonding based on the difference in the electronegativity of the two carboxylic acid compounds. The photocatalyst having a hierarchical pore structure may have improved accessibility to active sites and may improve the adsorption and photocatalytic effect of a volatile organic compound by facilitating mass diffusion.

"Hierarchical pores," as used herein, generally refer to pores that span two or more different length scales. Thus, "hierarchically porous materials" are materials which contain pores that span two or more length scales. In some embodiments, there can be a distribution of pore diameters at each length scale, where often the distributions of pore diameters are sufficiently narrow so that there is little or no overlap between the pore size distributions. In some cases, there are some pore sizes for which few or no pores are present in such a hierarchically porous material. In most cases, the hierarchically porous materials have mesopores and macropores (and optionally micropores).

In addition, the titanium-organic framework photocatalyst of the present disclosure is advantageous in that pore size can be controlled by adjusting the mixing ratio of the carboxylic acid compounds and superior ability of removing a volatile organic compound (VOC) can be achieved as the efficiency of adsorption and decomposition of the VOC are improved. In addition, the photocatalytic degradation rate of the VOC can be improved due to superior charge separation capability.

Specifically, the present disclosure provides a method for preparing a titanium-organic framework photocatalyst for adsorption and decomposition of a volatile organic compound, which includes: a step of preparing a mixture solution by mixing a first carboxylic acid compound and a second carboxylic acid compound in an organic solvent; a step of preparing a reactant by mixing a titanium precursor in the mixture solution; and a step of preparing a titanium-organic framework photocatalyst by reacting the reactant at 130-180° C. for 18-30 hours, wherein the first carboxylic acid compound and the second carboxylic acid compound are mixed at a molar ratio of 4:1-1:4 in the mixture solution.

In the step of preparing a mixture solution, a mixture solution may be prepared by mixing two carboxylic acid compounds having different electronegativity in an organic solvent. The mixture solution may induce competitive coordination bonding during nucleation using the organic linkers having different electronegativity.

The mixture solution may be one in which the first carboxylic acid compound and the second carboxylic acid compound are mixed at a molar ratio of 4:1-1:4, specifically 3:1-1:3, more specifically 2:1-1:2, most specifically 1:1. If the mixing ratio of the first carboxylic acid compound and the second carboxylic acid compound exceeds 4:1, the efficiency of removing a volatile organic compound through adsorption and decomposition may be decreased greatly due to relatively decreased pore size although the specific surface area of the photocatalyst is increased. Otherwise, if it is smaller than 1:4, the efficiency of photocatalytic degradation of a volatile organic compound may be unsatisfactory due to decreased specific surface area of the photocatalyst although pore size may be increased.

The organic solvent may be one or more selected from a group consisting of N,N-dimethylformamide (DMF), N,N-diethylformamide (DEF), an alcohol, a ketone and a hydrocarbon, specifically N,N-dimethylformamide.

The first carboxylic acid compound and the second carboxylic acid compound may induce competitive coordination bonding as organic linkers during nucleation owing to electron affinity caused by the difference in electronegativity. During the coordination bonding, a titanium-organic framework photocatalyst having a hierarchical pore structure may be formed as some missing-linker defects are formed in nanosized primary particles.

The first carboxylic acid compound may have an electronegativity of 3.0-3.5, specifically 3.1-3.3. Specifically, the first carboxylic acid compound may be 1,4-benzenedicarboxylic acid having an amino group, a hydroxyl group or an amino group and a hydroxyl group, or 4,4-biphenyldicarboxylic acid having an amino group, a hydroxyl group or an amino group and a hydroxyl group. More specifically, it may be amino-1,4-benzenedicarboxylic acid ($NH_2$—$H_2BDC$). The amino-1,4-benzenedicarboxylic acid may form dense electron cloud as $NH_2$-$BDC^{2-}$ is coordination bonded to unsaturated $Ti^{4+}$ ion due to the low electronegativity of 3.2 as compared to other compounds.

The second carboxylic acid compound may have an electronegativity of 3.6-3.9, specifically 3.7-3.8, which is higher than that of the first carboxylic acid compound. Specifically, the second carboxylic acid compound may be 1,4-benzenedicarboxylic acid or 1,4-benzenedicarboxylic acid having a hydroxyl group. More specifically, it may be 1,4-benzenedicarboxylic acid. The 1,4-benzenedicarboxylic acid $BDC^{2-}$ has an electronegativity of 3.7 and it may slowly coordination bonded with unsaturated $Ti^{4+}$ ion that firstly coordination bonded with the first carboxylic acid compound to form a secondary building unit (SBU) due to hydrogen bonding between —$NH_2$ and —COON in the first carboxylic acid compound.

For the single or two (biphenyl) benzenes, the activating capability of electron-donating groups may be in the order of —$NH_2$>—OH>—Br>—$NO_2$. Among them, —Br and —$NO_2$ were excluded because they are electron-withdrawing groups. Therefore, the hierarchical pore structure of a MOF may be controlled through a combination of the first carboxylic acid compound having —$NH_2$ or —OH and the second carboxylic acid compound with or without —OH.

The titanium precursor may be one or more selected from a group consisting of titanium isopropoxide, titanium propoxide, titanium butoxide and titanium tetraisopropoxide, specifically titanium isopropoxide.

The content of titanium may be 18-35 wt %, specifically 21-32 wt %, more specifically 24-30 wt %, most specifically 26-28 wt %, based on 100 wt % of the titanium-organic framework photocatalyst. If the content of titanium is less than 18 wt %, the decomposition activity of the photocatalyst may be decreased. And, if it exceeds 35 wt %, further improved decomposition activity cannot be expected and manufacturing cost is increased.

In the step of preparing the titanium-organic framework photocatalyst, the reactant may be reacted at 130-180° C. for 18-30 hours. Specifically, the reaction may be performed at 140-160° C. for 22-26 hours. If the reaction temperature and reaction time are not satisfied, a titanium-organic framework photocatalyst having a hierarchical pore structure may not be formed as desired.

The titanium-organic framework photocatalyst may have a hierarchical pore structure with an average pore size of 2-50 nm and a specific surface area of 414-931 $m^2/g$. Specifically, it may have an average pore size of 3-20 nm and a specific surface area of 570-650 $m^2/g$. Most specifically, it may have an average pore size of 5-10 nm and a specific surface area of 610-623 $m^2/g$. Due to the large pore size, the titanium-organic framework photocatalyst can have improved ability of removing a volatile organic compound owing to improved adsorption performance of the volatile organic compound and can have superior charge separation capability that facilitates the photocatalytic degradation of the volatile organic compound.

If the titanium-organic framework photocatalyst does not satisfy the average pore size and specific surface area requirements described above, it is difficult to form a hierarchical pore structure and the ability of adsorbing and decomposing a volatile organic compound may be unsatisfactory. The hierarchical pore structure may provide improved accessibility to active sites and improve the adsorption and photocatalytic effect of a volatile organic compound by facilitating mass diffusion.

The titanium-organic framework photocatalyst may have a polyhedral shape having (001), (110) and (111) crystal planes. It may have two (001) planes, four (110) planes and eight (111) planes. If a single carboxylic acid compound is used instead of two carboxylic acid compounds, the adsorption and decomposition ability of the titanium-organic framework photocatalyst may be decreased because irregularly truncated octahedral, rather than polyhedral, particles are formed and the crystal planes, on which a volatile organic compound are adsorbed, are decreased.

The titanium-organic framework photocatalyst may have an average particle size of 0.42-1.5 μm, specifically 0.5-1.0 μm, more specifically 0.6-0.8 μm, most specifically 0.6-0.7

μm. If the average particle size is smaller than 0.42 μm, excess hierarchical pores may be formed together with (001), (110) and (111) crystal planes. And, if the average particle size exceeds 1.5 μm, disc-shaped octahedrons with predominant (001) planes and without pores may be formed.

The titanium-organic framework photocatalyst may exhibit a C=O peak (P1) and an O—H peak (P2) at 531.5-532 eV and 533-534 eV upon X-ray photoelectron spectroscopy (XPS) and the peak area ratio (P2/P1) of the C=O peak (P1) to the O—H peak (P2) may be 0.2-0.9, specifically 0.3-0.8, more specifically 0.35-0.7, most specifically 0.4-0.5.

In general, the binding energy (peak area) of the C=O peak (P1) is decreased and that of the O—H peak (P2) is increased in O 1s XPS if there are excess missing linkers. The titanium-organic framework photocatalyst of the present disclosure may exhibit the lowest C=O peak area and high O—H peak area because missing linkers are replaced by —OH bonds. As a result, if the peak area ratio (P2/P1) of the photocatalyst is smaller than 0.2, a smooth surface with a small surface area may be formed. And, if it exceeds 0.9, a MOF having excess hierarchical pores may be formed due to missing linkers.

The titanium-organic framework photocatalyst may have a bandgap energy of 2.17-2.66 eV, specifically 2.31-2.52 eV, most specifically 2.33-2.40 eV. The controlled bandgap energy originates from the strong electron-donating ability of an aromatic amine and the photodegradation efficiency of a volatile organic compound can be further improved when the above condition is satisfied as light absorption occurs actively.

The volatile organic compound may be one or more selected from a group consisting of toluene, an aldehyde, ketone, benzene, ethylbenzene, xylene and a chlorohydrocarbon, although not being limited thereto.

Although it was not described explicitly in the following examples, comparative examples, etc., adsorption and decomposition of volatile organic compounds were conducted for 100 cycles using titanium-organic framework photocatalysts prepared according to the present disclosure under various conditions.

As a result, it was confirmed that superior ability of adsorbing and decomposing volatile organic compounds was maintained for 100 cycles when all of the following nine conditions were satisfied. In addition, it was confirmed that the volatile organic compounds adsorbed on the photocatalysts could be completely removed as they were photodegraded into water and carbon dioxide.

(1) The organic solvent is N,N-dimethylformamide (DMF), and the first carboxylic acid compound is amino-1, 4-benzenedicarboxylic acid, (2) the second carboxylic acid compound is 1,4-benzenedicarboxylic acid, (3) the mixture solution is a mixture of the first carboxylic acid compound and the second carboxylic acid compound at a molar ratio of 2:1-1:2, and the titanium precursor is titanium isopropoxide, (4) the titanium is contained in an amount of 26-28 wt % based on 100 wt % of the titanium-organic framework photocatalyst, (5) the titanium-organic framework photocatalyst has a hierarchical pore structure with an average pore size of 5-10 nm and a specific surface area of 610-623 m$^2$/g, (6) the titanium-organic framework photocatalyst has a polyhedral shape with (001), (110) and (111) crystal planes and (7) an average particle size of 0.6-0.7 μm, (8) the titanium-organic framework photocatalyst exhibits a C=O peak (P1) and a O—H peak (P2) at 531.5-532 eV and 533-534 eV upon X-ray photoelectron spectroscopy (XPS) and the peak area ratio (P2/P1) of the C=O peak (P1) to the O—H peak (P2) is 0.4-0.5, and (9) the titanium-organic framework photocatalyst has a bandgap energy of 2.33-2.40 eV.

If any of the above nine condition was not satisfied, the adsorption or decomposition of the volatile organic compounds was not achieved properly and recyclability was decreased rapidly after 50 cycles. In addition, it was confirmed that the removal efficiency was low because the volatile organic compounds adsorbed on the photocatalyst were not photodegraded completely.

FIG. 1 schematically shows the mechanism of a titanium-organic framework photocatalyst (Ti-MOF) having a hierarchical pore structure according to the present disclosure. Referring to FIG. 1, NH$_2$—H$_2$BDC having low electronegativity can be coordination bonded to Ti$^{4+}$ ions and, as a result, the electron cloud of Ti$^{4+}$ ions can be increased. Then, some of the H$_2$BDC may be induced to be coordination bonded to these unsaturated Ti$^{4+}$ ions due to hydrogen bonding between —NH$_2$ and —COON in the NH$_2$—H$_2$BDC. As a result, a secondary building unit (SBU) may be formed together with the mixed organic linkers. Then, a turbid solution consisted of the nanosized primary particles may be formed through self-assembly and precipitation. At the same time, secondary nucleation of unreacted H$_2$BDC may be limited as it is adsorbed to the cavity of the nanosized primary particles. As a result, missing linker defects are formed gradually in the nanosized primary particles and the hierarchical pore structure of Ti-MOF is formed by self-assembly of primary particles during nucleation.

In addition, the present disclosure provides a titanium-organic framework photocatalyst for adsorption and decomposition of a volatile organic compound, wherein the titanium-organic framework photocatalyst has a titanium-organic framework structure wherein a titanium ion and a mixture of a first carboxylic acid compound and a second carboxylic acid compound are coordination bonded due to the difference in electronegativity, and the mixture is a mixture of the first carboxylic acid compound and the second carboxylic acid compound at a molar ratio of 4:1-1:4.

The first carboxylic acid compound may have an electronegativity of 3.0-3.5, and may be one or more selected from a group consisting of 1,4-benzenedicarboxylic acid having an amino group, a hydroxyl group or an amino group and a hydroxyl group and 4,4-biphenyldicarboxylic acid having an amino group, a hydroxyl group or an amino group and a hydroxyl group.

The second carboxylic acid compound may have an electronegativity of 3.6-3.9, and may be 1,4-benzenedicarboxylic acid or 1,4-benzenedicarboxylic acid having a hydroxyl group.

The titanium-organic framework photocatalyst may have a hierarchical pore structure with an average pore size of 2-50 nm and a specific surface area of 414-931 m$^2$/g. Specifically, the average pore size may be 3-20 nm and the specific surface area may be 570-650 m$^2$/g. Most specifically, the average pore size may be 5-10 nm and the specific surface area may be 610-623 m$^2$/g.

The titanium-organic framework photocatalyst may have a polyhedral shape with (001), (110) and (111) crystal planes and may have an average particle size of 0.42-1.5 μm, specifically 0.5-1.0 μm, more specifically 0.6-0.8 μm, most specifically 0.6-0.7 μm.

The titanium-organic framework photocatalyst may have a bandgap energy of 2.17-2.66 eV, specifically 2.31-2.52 eV, most specifically 2.33-2.40 eV.

In addition, the present disclosure provides an apparatus for adsorption and decomposition of a volatile organic compound, which includes the titanium-organic framework photocatalyst.

In addition, the present disclosure provides a method for removing a volatile organic compound using a titanium-organic framework photocatalyst, which includes: a step of preparing a titanium-organic framework photocatalyst by the method described above; a step of adsorbing a volatile organic compound included in a waste gas at a concentration of 1-3,000 ppm using the photocatalyst; and a step of decomposing the volatile organic compound adsorbed on the photocatalyst by irradiating light to the photocatalyst with the volatile organic compound adsorbed.

Hereinafter, the present disclosure will be described more specifically through examples. However, the present disclosure is not limited by the examples.

Example 1

Preparation of Ti-MOF-4

Ti-MOF was prepared by one-pot solvothermal synthesis. Specifically, a mixture solution was prepared by completely mixing 4.8 mmol of $NH_2$—$H_2BDC$ and 1.2 mmol of $H_2BDC$ in 20 mL of pure DMF. The molar ratio of $NH_2$—$H_2BDC$ and $H_2BDC$ in the mixture solution was 4:1. Then, after adding 2.2 mL of methanol to the mixture solution, the mixture was stirred for 1 hour. Then, after injecting 0.9 mL of titanium isopropoxide to 23.1 mL of the uniformly stirred mixture solution, the mixture was stirred until precipitation occurred. The obtained suspension was transferred to a 60-mL Teflon-lined stainless steel autoclave and kept at 150° C. for 24 hours. Subsequently, after cooling naturally to room temperature, the obtained precipitate were washed by methanol and DMF separately 3 times with methanol to remove remaining organic ligands and metal salts. The obtained precipitate was centrifuged to collect powder. Ti-MOF-4 was prepared by drying the collected powder in vacuo at 100° C. for 6 hours.

Example 2

Preparation of Ti-MOF-2

Ti-MOF-2 was prepared in the same manner as in Example 1 except that $NH_2$—$H_2BDC$ and $H_2BDC$ were mixed at a molar ratio of 2:1. The total content of the organic linkers was 6 mmol.

Example 3

Preparation of Ti-MOF-1

Ti-MOF-1 was prepared in the same manner as in Example 1 except that $NH_2$—$H_2BDC$ and $H_2BDC$ were mixed at a molar ratio of 1:1. The total content of the organic linkers was 6 mmol.

Example 4

Preparation of Ti-MOF-0.5

Ti-MOF-0.5 was prepared in the same manner as in Example 1 except that $NH_2$—$H_2BDC$ and $H_2BDC$ were mixed at a molar ratio of 1:2. The total content of the organic linkers was 6 mmol.

10

Example 5

Preparation of Ti-MOF-0.25

Ti-MOF-0.25 was prepared in the same manner as in Example 1 except that $NH_2$—$H_2BDC$ and $H_2BDC$ were mixed at a molar ratio of 1:4. The total content of the organic linkers was 6 mmol.

Example 6

Preparation of Ti-MOF-1S

A precipitate was obtained in the same manner as in Example 3. Ti-MOF-1S was prepared by sonicating the obtained precipitate for 10 seconds and then stirring for 10 minutes.

Comparative Example 1: Preparation of MIL-125

MIL-125 was prepared in the same manner as in Example 1 except that $NH_2$—$H_2BDC$ and $H_2BDC$ were mixed at a molar ratio of 0:1.

Comparative Example 2: Preparation of MIL-125($NH_2$)

MIL-125($NH_2$) was prepared in the same manner as in Example 1 except that $NH_2$—$H_2BDC$ and $H_2BDC$ were mixed at a molar ratio of 1:0.

Test Example 1: Analysis of BET Specific Surface Area and XRD Spectra of Ti-MOFs The BET (Brunauer-Emmett-Teller) specific surface area and pore size distribution of the Ti-MOFs prepared in Examples 1-5 and Comparative Examples 1 and 2 were investigated using $N_2$ adsorption-desorption isotherms, DFT (density-functional theory) models and X-ray diffraction (XRD) spectra. The result is shown in Table 1 and FIGS. 2A to 2D.

Figure 2A:
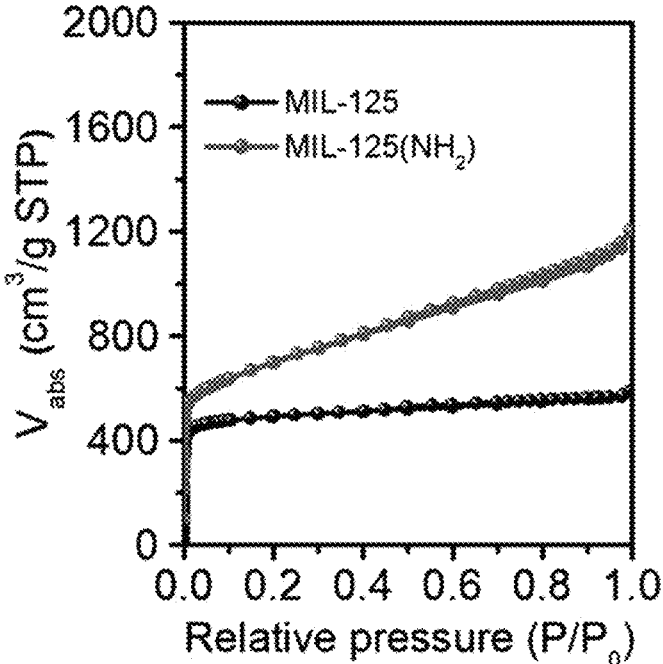
FIGS. 2A and 2B show the nitrogen adsorption-desorption isotherms and FIGS. 2C and 2D show pore size distribution of Ti-MOFs prepared in Examples 1-5 and Comparative Examples 1 and 2.
Figure 2B:
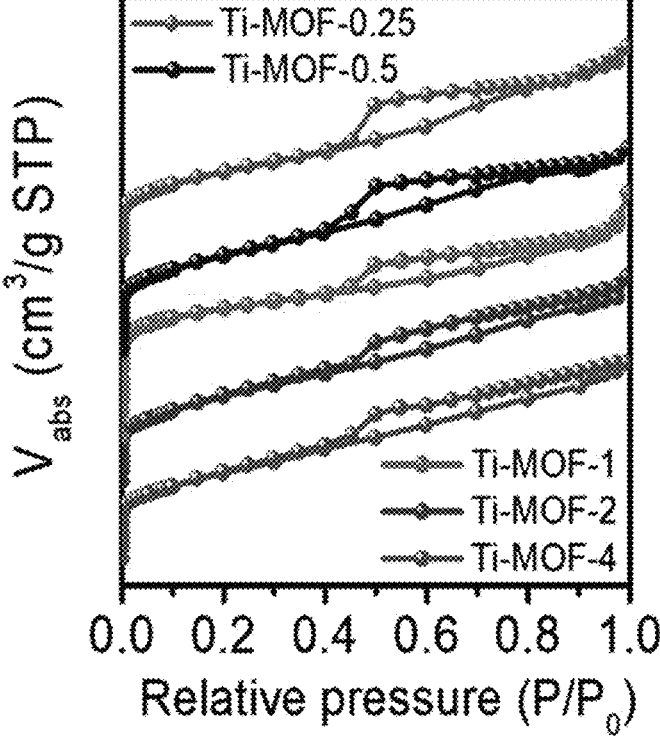
Figure 2C:
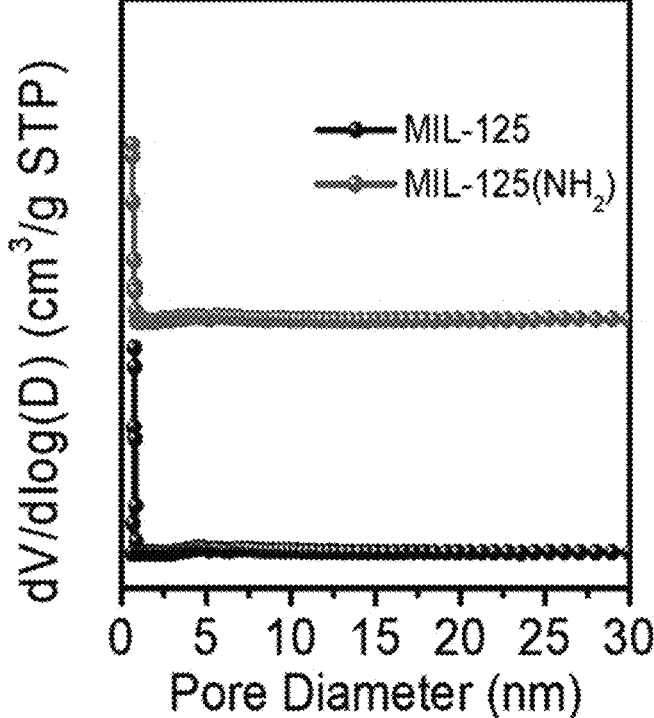
Figure 2D:
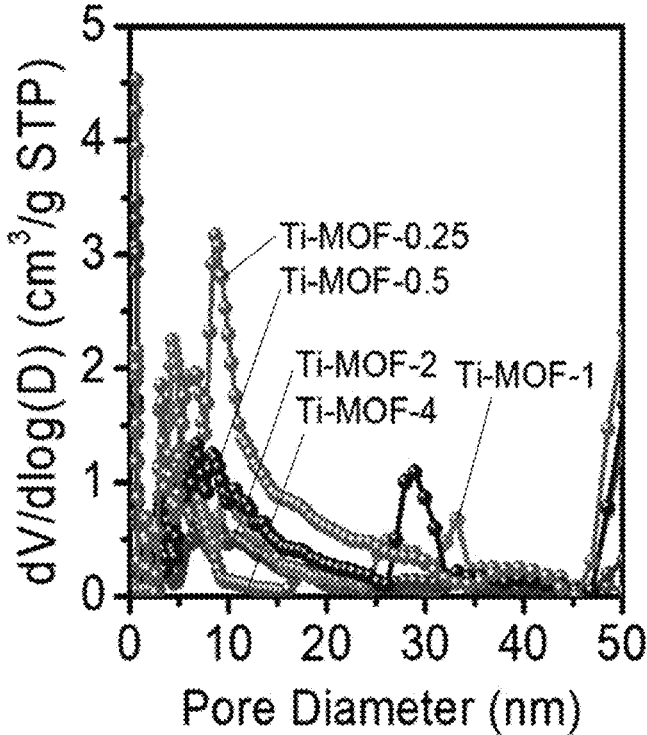

FIGS. 2A and 2B show the nitrogen adsorption-desorption isotherms and FIGS. 2C and 2D show pore size distribution of the Ti-MOFs prepared in Examples 1-5 and Comparative Examples 1 and 2.

TABLE 1

|  | $S_{BET}$[a] ($m^2$/g) | $S_{Micro}$[b] ($m^2$/g) | $S_{Ext}$[c] ($m^2$/g) | $S_{Micro}$/ $S_{Ext}$ |
|---|---|---|---|---|
| Comp. Ex. 1 (ML-125) | 1944 | 1737 | 207 | 8.39 |
| Comp. Ex. 2 (ML-125($NH_2$)) | 2518 | 1343 | 1175 | 1.14 |
| Ex. 6 (TI-MOF-1S) | 1415 | 946.6 | 468.4 | 2.02 |
| Ex. 1 (Ti-MOF-4) | 930.4 | 664.2 | 266.2 | 2.49 |
| Ex. 2 (Ti-MOF-2) | 597.6 | 169.0 | 428.7 | 0.39 |
| Ex. 3 (Ti-MOF-1) | 619 | 163.7 | 455.3 | 0.36 |
| Ex. 4 (Ti-MOF-0.5) | 570 | 113.2 | 456.8 | 0.25 |
| Ex. 5 (Ti-MOF-0.25) | 414.6 | 77.05 | 337.55 | 0.23 |

[a]$S_{BET}$: BET (Brunauer-Emmett-Teller) specific surface area.
[b]$S_{Micro}$ was calculated from the $N_2$ adsorption-desorption isotherms using the specific surface area of micropores by the t-plot method.
[c]$S_{Ext} = S_{BET} - S_{Micro}$.

Referring to FIGS. 2A to 2D and Table 1, Comparative Example 2 (MIL-125-$NH_2$) and Comparative Example 1

(MIL-125) showed microporous structures of 0.74 nm and 0.80 nm. In contrast, the isotherms of Examples 1-5 (Ti-MOF-x) showed abrupt absorption ($P/P_0 < 0.1$, corresponding to type I) and visible hysteresis loops ($0.4 \leq P/P_0 \leq 0.9$, corresponding to type IV), indicating that all the Ti-MOF-x have hierarchical pore structures.

For Examples 1-5, pore size was increased in a range from 2 to 50 nm as the x value of Ti-MOF-x was increased. In addition, all the Ti-MOF-x had BET values smaller than those of Comparative Examples 1 and 2. This was because the formation of mesopores partially sacrificed the initial microporous structure.

Figure 3A:
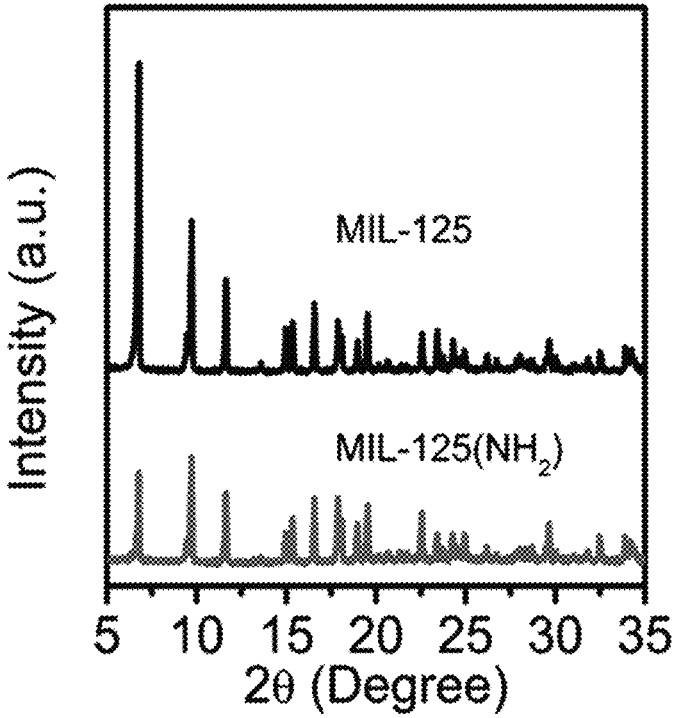
FIGS. 3A and 3B show the XRD spectra of Ti-MOFs prepared in Examples 1-5 and Comparative Examples 1 and 2.
Figure 3B:
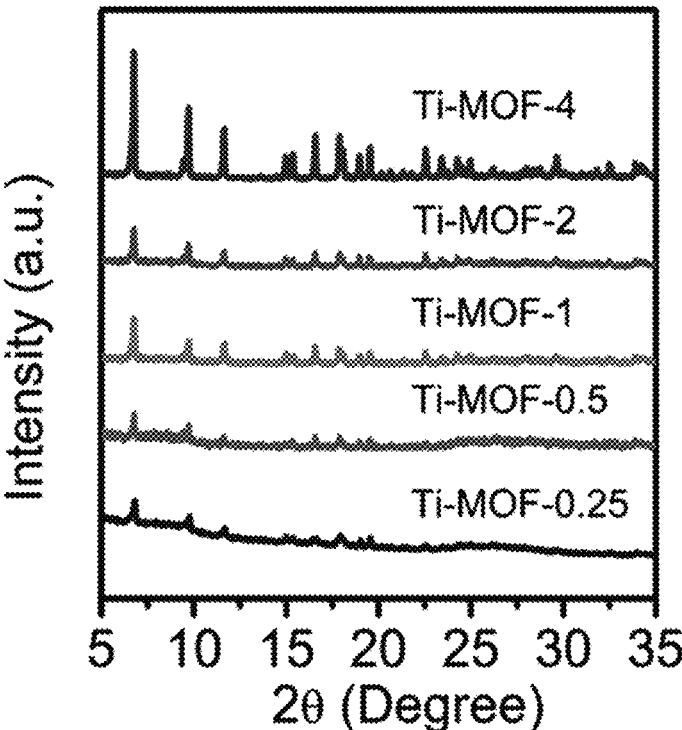

FIGS. 3A and 3B show the XRD spectra of the Ti-MOFs prepared in Examples 1-5 and Comparative Examples 1 and 2. Referring to FIGS. 3A and 3B, the Ti-MOF-x of Examples 1-5 show poor crystallinity although they have the same crystal structure as Comparative Example 1 (MIL-125).

Test Example 2: Analysis of SEM, TEM and EDS Mapping of Ti-MOFs

SEM, TEM and energy-dispersive spectroscopy (EDS) mapping analyses were performed to investigate the surface morphology of the Ti-MOFs prepared in Examples 1-5 and Comparative Examples 1 and 2. The result is shown in FIGS. 4A to 4C, 5, and 6.

Figure 4A:
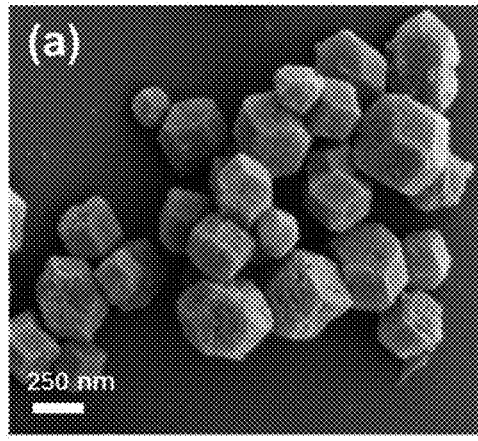
FIGS. 4A to 4C show the SEM images of Ti-MOFs prepared in Example 1 (Ti-MOF-4), Example 2 (Ti-MOF-2) and Example 5 (Ti-MOF-0.25), respectively.
Figure 4B:
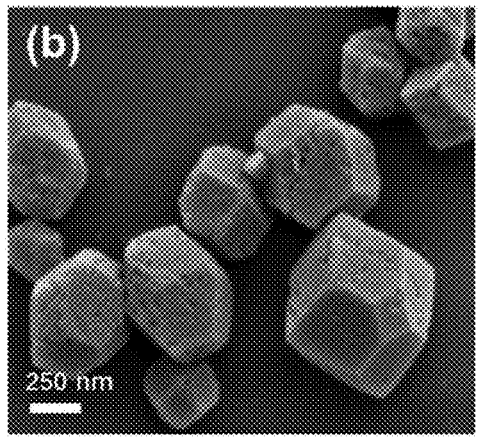
Figure 4C:
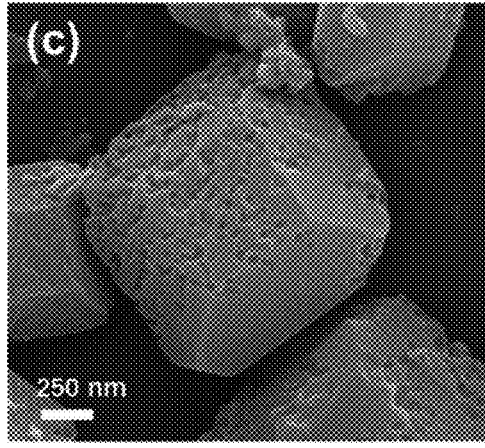

FIGS. 4A to 4C show the SEM images of the Ti-MOFs prepared in Example 1 (Ti-MOF-4), Example 2 (Ti-MOF-2) and Example 5 (Ti-MOF-0.25), respectively.

Figure 5A:
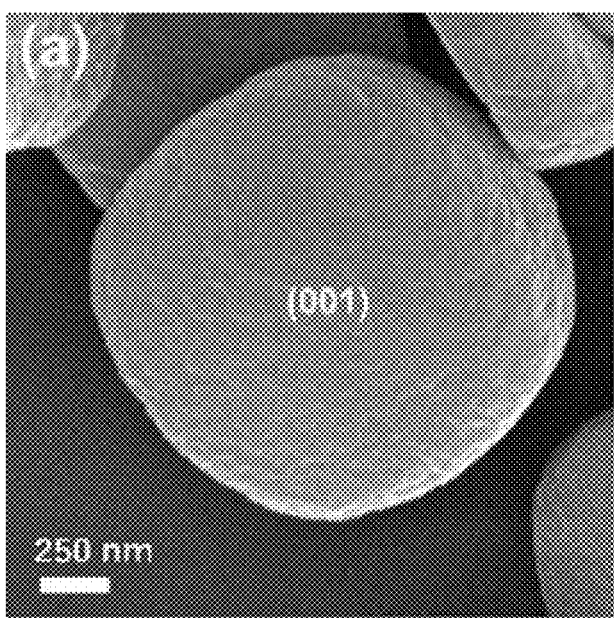
FIGS. 5A to 5H show the SEM and TEM images of Ti-MOFs prepared in Example 3 (Ti-MOF-1) (FIGS. 5C and 5G), Example 4 (Ti-MOF-0.5) (FIGS. 5D and 5H), Comparative Example 1 (MIL-125) (FIGS. 5B and 5F) and Comparative Example 2 (MIL-125(NH$_2$)) (FIGS. 5A and 5E).
Figure 5B:
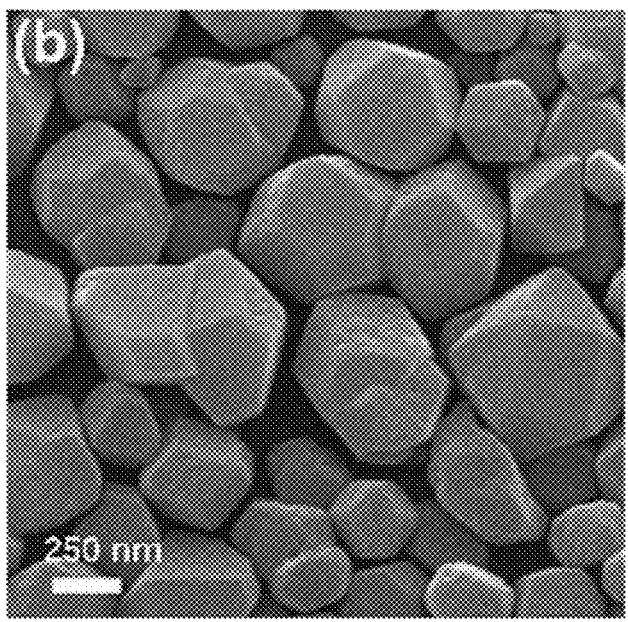
Figure 5C:
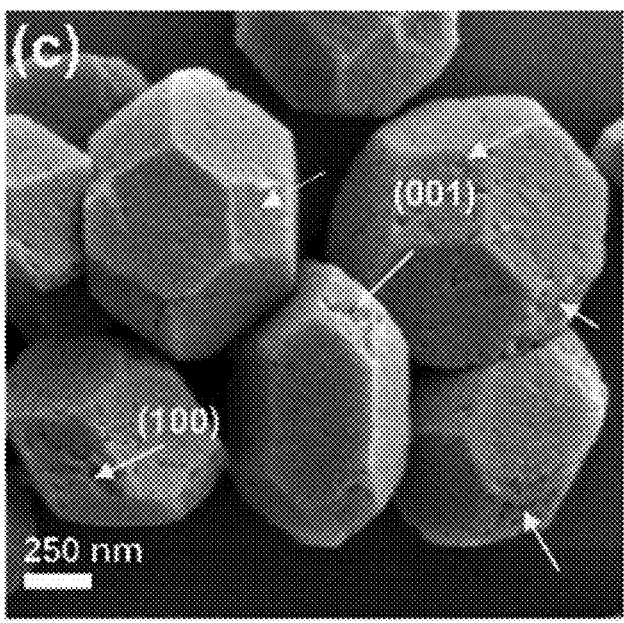
Figure 5D:
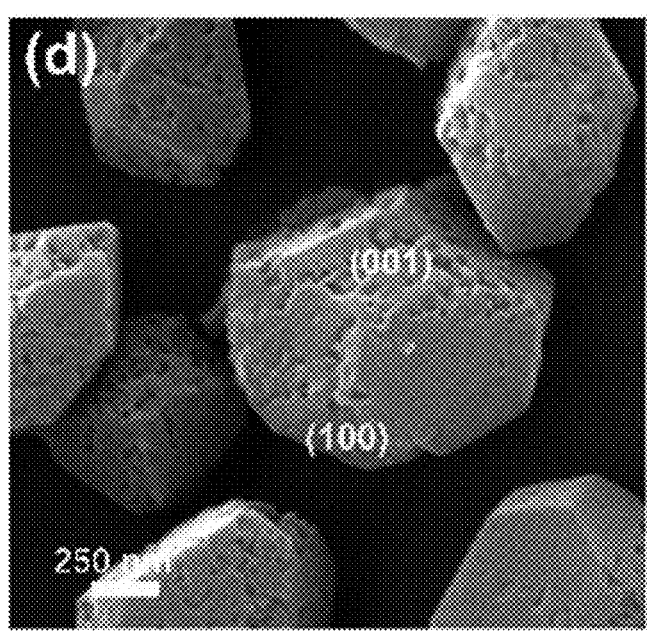
Figure 5E:
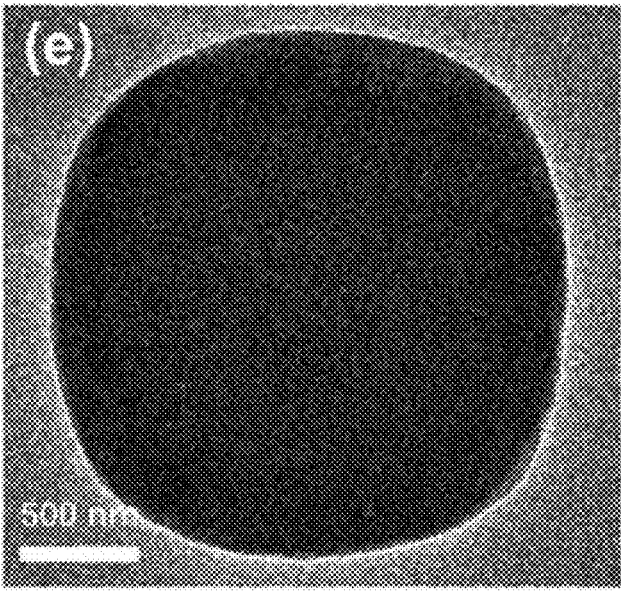
Figure 5F:
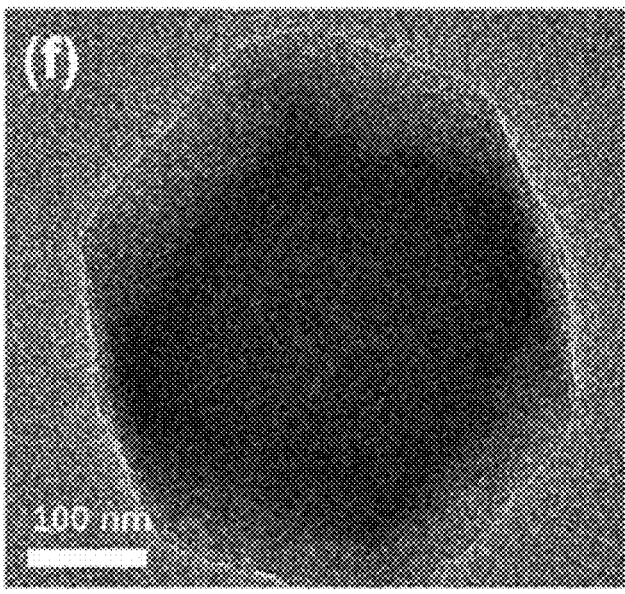
Figure 5G:
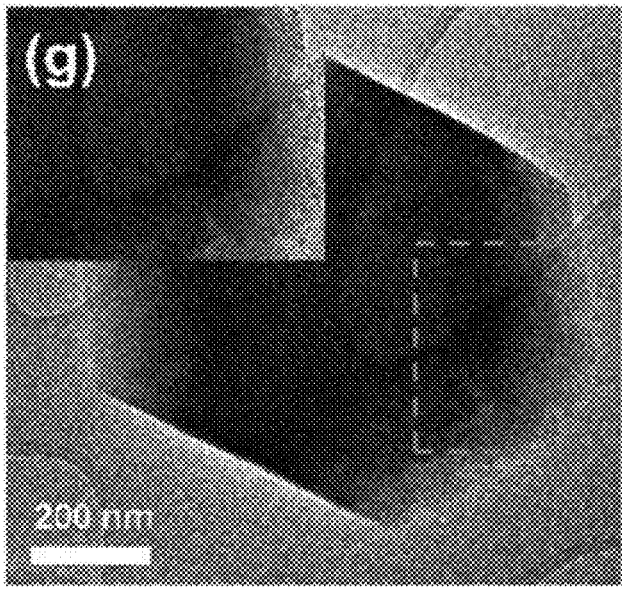
Figure 5H:
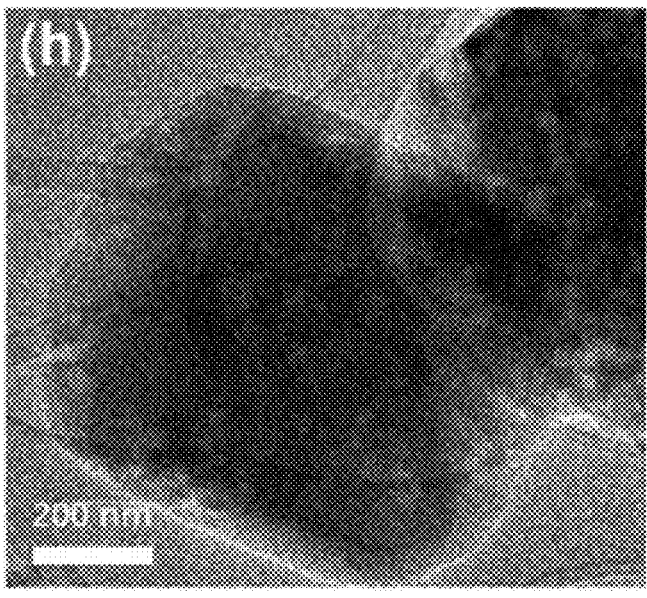

FIGS. 5A to 5H show the SEM and TEM images of the Ti-MOFs prepared in Example 3 (Ti-MOF-1) (FIGS. 5C and 5G), Example 4 (Ti-MOF-0.5) (FIGS. 5D and 5H), Comparative Example 1 (MIL-125) (FIGS. 5B and 5F) and Comparative Example 2 (MIL-125(NH$_2$)) (FIGS. 5A and 5E).

Referring to FIGS. 4A to 4C and 5, the MIL-125 of Comparative Example 1 synthesized using a single H$_2$BDC linker (a, e) had a disk-like plate shape with a dominant (001) crystal plane, and the MIL-125(NH$_2$) of Comparative Example 2 synthesized using a single NH$_2$—H$_2$BDC linker (b, f) had an irregularly truncated octahedral shape. When the organic linkers H$_2$BDC and NH$_2$—H$_2$BDC were used in combination, appreciable evolution in morphology was observed between Comparative Example 1 (MIL-125) and Comparative Example 2 (MIL-125(NH$_2$)).

Example 3 (Ti-MOF-1) (c, g) showed a truncated square plate shape with two (001), four (110) and eight (111) crystal planes. In particular, unlike Comparative Example 1 (MIL-125) and Comparative Example 2 (MIL-125-NH$_2$), all the Ti-MOF-x having rough surface showed hierarchical pores and the pore size was increased gradually as the x value was decreased.

When the formation of hierarchical pores was investigated by transmission electron microscopy (TEM), Example 3 (Ti-MOF-1) (g) showed hierarchical pores as bright spots as compared to Comparative Example 1 (MIL-125) (f) and Comparative Example 2 (MIL-125(NH$_2$)) (e). The bright spots were more distinct and larger for Example 4 (Ti-MOF-0.5) (h). This result was consistent with the SEM result of FIG. 2D.

Figure 6:
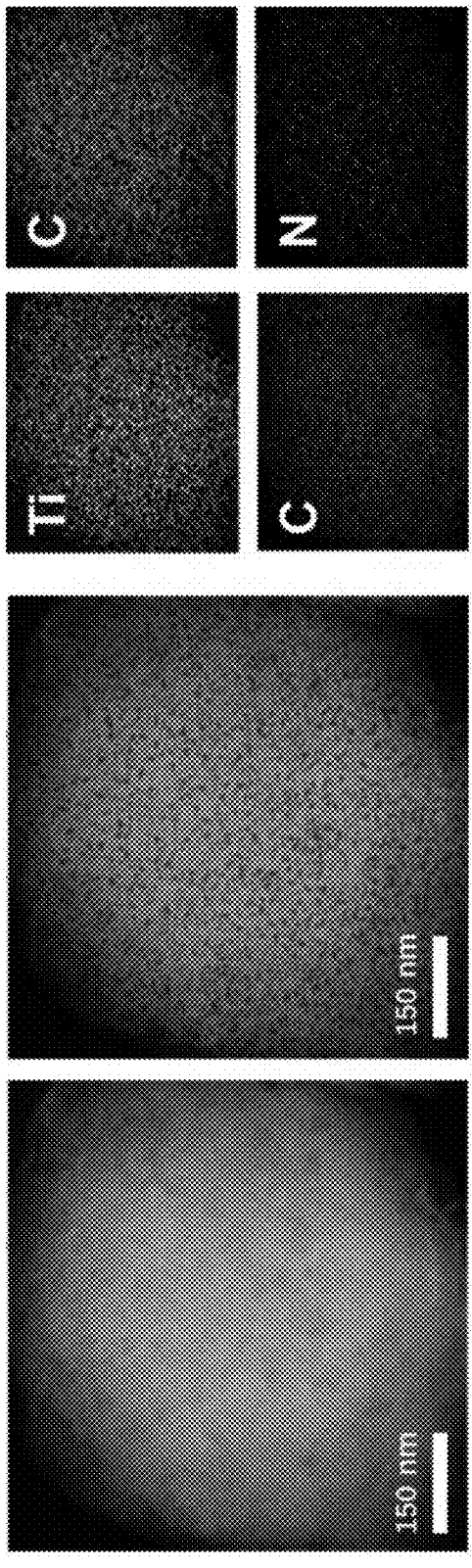
FIG. 6 shows the energy-dispersive spectroscopy (EDS) mapping result of Ti-MOF-1 prepared in Example 3.

FIG. 6 shows the energy-dispersive spectroscopy (EDS) mapping result of the Ti-MOF-1 prepared in Example 3. Referring to FIG. 6, it can be seen that C, Ti, N and O are distributed uniformly in the Ti-MOF-1.

Test Example 3: Analysis of XPS, TGA and H NMR of Ti-MOFs

X-ray photoelectron spectroscopy (XPS), TGA and HNMR analyses were performed to investigate the electronic structure and binding energy of the Ti-MOFs prepared in Examples 2-4 and 6 and Comparative Examples 1 and 2. The result is shown in Tables 2 and 3 and FIGS. 7A to 7D. 4 M NaOH/D$_2$O was used as a solvent.

FIGS. 7A to 7D show the high-resolution XPS spectra for Ti 2p and O 1s (FIGS. 7A and 7B), TGA curves (FIG. 7C) and $^1$H NMR spectra (FIG. 7D) of the Ti-MOFs prepared in Examples 2-4 and Comparative Examples 1 and 2.

TABLE 2

| | Ti—O (P1) (% area) | C=O (P2) (% area) | —OH (P3) (% area) |
|---|---|---|---|
| Comp. Ex. 1 (ML-125) | 40.23 | 55.59 | 4.18 |
| Comp. Ex. 2 (ML-125(NH$_2$)) | 38.94 | 56.93 | 4.13 |
| Ex. 3 (Ti-MOF-1) | 56.45 | 29.20 | 14.35 |
| Ex. 6 (Ti-MOF-1S) | 35.34 | 58.4 | 6.24 |

Figure 7A:
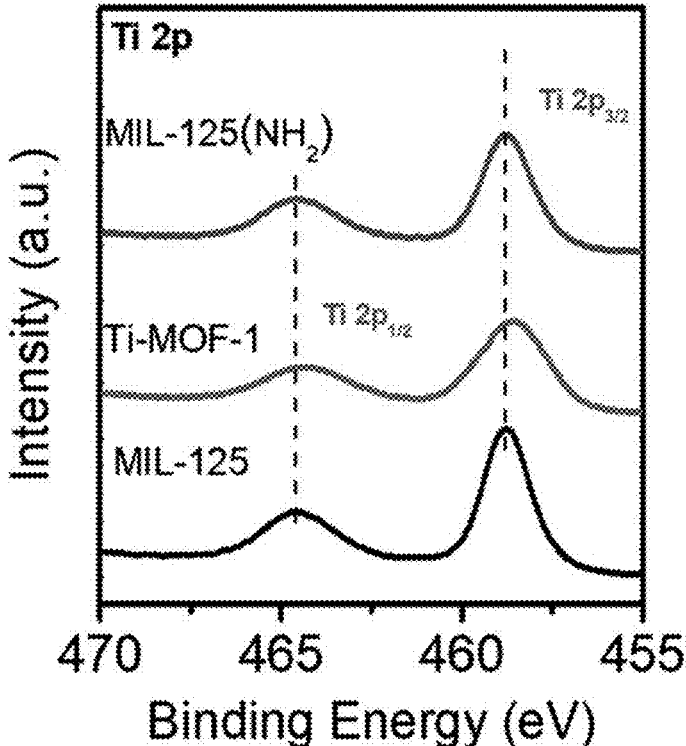
FIGS. 7A to 7D show the high-resolution XPS spectra for Ti 2p and O 1s (FIGS. 7A and 7B), TGA curves (FIG. 7C) and $^1$H NMR spectra (FIG. 7D) of Ti-MOFs prepared in Examples 2-4 and Comparative Examples 1 and 2.

Referring to FIG. 7A, two major peaks were observed at 458.8 eV and 464.5 eV in the Ti 2p spectra, and they were identified as Ti 2p$_{3/2}$ and Ti 2p$_{1/2}$, respectively. In particular, the Ti 2p peaks indicate that Ti$^{3+}$ ion is generated as the binding energy of Example 3 (Ti-MOF-1) is decreased as compared to that of Comparative Examples 1 and 2.

Figure 7B:
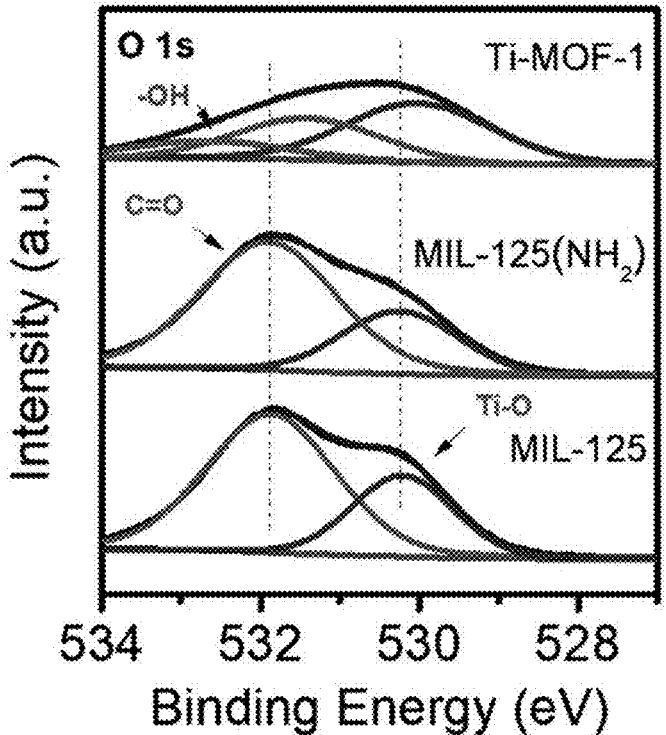

In addition, referring to FIG. 7B, it was confirmed that the O 1s peaks of Example 3 (Ti-MOF-1) at 530.1, 531.5 and 533.4 eV, attributed to Ti—O, C=O and —OH, were shifted to slightly lower binding energy as compared to the peaks of other samples.

In contrast, as seen from Table 2, the linker content of Example 3 (Ti-MOF-1) calculated from normalized peak areas was lower than those of Comparative Example 1 (MIL-125) and Comparative Example 2 (MIL-125-NH$_2$) due to missing linker defects. Likewise, the —OH content of Example 3 (Ti-MOF-1) was increased because the missing linkers could be replaced with —OH. In particular, Example 3 (Ti-MOF-1) showed a P2/P1 area ratio of 0.52 and a P3/P2 area ratio of 0.49.

Figure 7C:
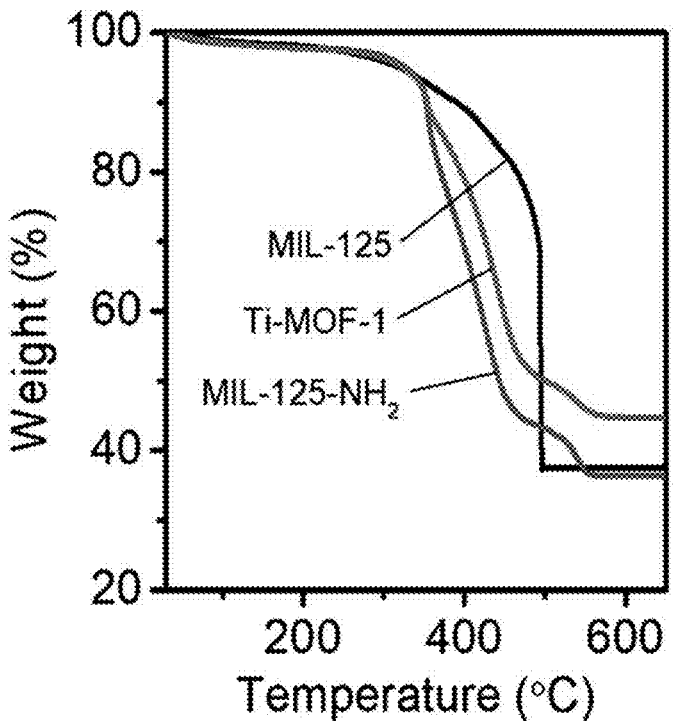

In addition, referring to FIG. 7C, the thermogravimetric analysis (TGA) of Example 3 (Ti-MOF-1) also showed a lower organic linker content as compared to Comparative Example 1 (MIL-125) and Comparative Example 2 (MIL-125-NH$_2$), which demonstrates the presence of missing linker defects.

Figure 7D:
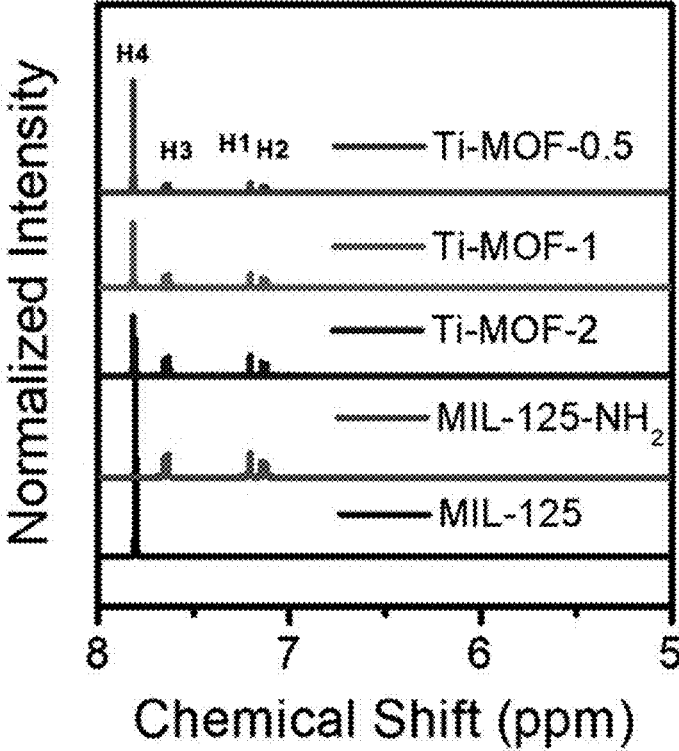

In addition, referring to FIG. 7D, proton nuclear magnetic resonance CH NMR) spectroscopy was performed to identify the missing linkers. The result is summarized in Table 3. Table 3 shows the ratio of the contents of two organic linkers based on integral area.

TABLE 3

| | Integral | | Actual content | | Theoretical content | |
|---|---|---|---|---|---|---|
| | $NH_2$—$BDC^{2-}$ | $BDC^{2-}$ | $NH_2$—$BDC^{2-}$ | $BDC^{2-}$ | $NH_2$—$BDC^{2-}$ | $BDC^{2-}$ |
| Comp. Ex. 2 (ML-125(NH$_2$)) | 1 | 0 | 100% | 0 | 100% | 0 |
| Comp. Ex. 1 (ML-125) | 0 | 1 | 0 | 100% | 0 | 100% |
| Ex. 2 (Ti-MOF-2) | 1 | 1.33 | 75.05% | 24.95% | 67% | 33% |
| Ex. 3 (Ti-MOF-1) | 1 | 2.09 | 65.68% | 34.32% | 50% | 50% |
| Ex. 4 (Ti-MOF-0.5) | 1 | 5.77 | 40.94% | 59.06% | 33% | 67% |
| Ex. 6 (Ti-MOF-1S) | 1 | 2.95 | 57.55% | 42.44% | 50% | 50% |
| Precursor | 1 | 2.99 | 57.14% | 42.85% | 50% | 50% |

Referring to FIG. 7D and Table 3, the Ti-MOF-x of Examples 1-4 and 6 showed difference in the contents of $NH_2$-$BDC^{2-}$ and $BDC^{2-}$ from the theoretical contents. The low $BDC^{2-}$ linker contents of the Ti-MOF-x indicate that the missing linkers are dominantly $BDC^{2-}$. Through this, it was confirmed that the hierarchical pore structure of the MOF originates from the missing linker defects can contribute to the formation of hierarchical pores in the MOF structure.

Test Example 4: Analysis of Ti Content and Particle Size of Ti-MOFs

Inductively coupled plasma optical emission spectroscopy (ICP-OES) and SEM analyses were performed to investigate the Ti content of the Ti-MOFs prepared in Examples 1-6 and Comparative Examples 1 and 2. The result is shown in Table 4 and FIGS. 8A to 8H, 9, and 10.

TABLE 4

| | Ti content (wt %) |
|---|---|
| Comp. Ex. 1 (ML-125) | 20.74 |
| Comp. Ex. 2 (ML-125(NH$_2$)) | 16.60 |
| Ex. 3 (Ti-MOF-1) | 27.65 |
| Ex. 6 (Ti-MOF-1S) | 20.06 |

As seen from Table 4, the Ti content of Example 3 (Ti-MOF-1) was much higher than those of Comparative Example 1 (MIL-125) and Comparative Example 2 (MIL-125-NH$_2$). Through this, it was confirmed that only missing linker defects are present and the possibility of missing cluster defects can be excluded. In addition, for Example 6, when sonication was conducted to exclude the competition of the two organic linkers in order to confirm the formation of missing linkers intuitively, the Ti content was similar to that of Comparative Example 1 (MIL-125) due to the promoted nucleation rate of $H_2BDC$.

Figure 8A:
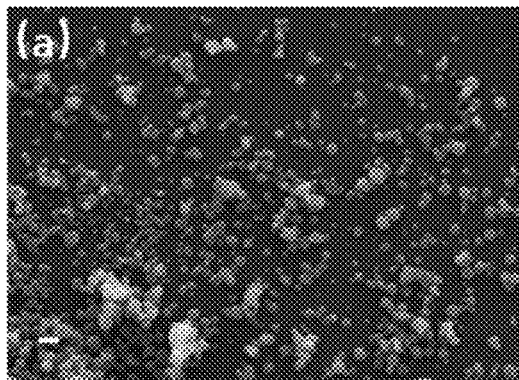
FIGS. 8A to 8H show the SEM images of Comparative Example 2 (MIL-125-NH$_2$) (FIG. 8A), Example 1 (Ti-MOF-4) (FIG. 8B), Example 2 (Ti-MOF-2) (FIG. 8C), Example 3 (Ti-MOF-1) (FIG. 8D), Example 4 (Ti-MOF-0.5) (FIG. 8E), Example 5 (Ti-MOF-0.25) (FIG. 8F), Comparative Example 1 (MIL-125) (FIG. 8G) and Example 6 (Ti-MOF-1S) (FIG. 8H). Scale bar=1 µm.
Figure 8B:
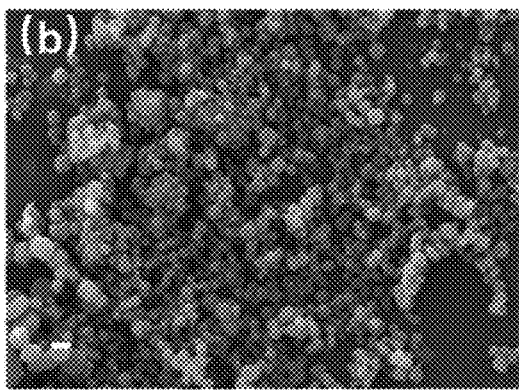
Figure 8C:
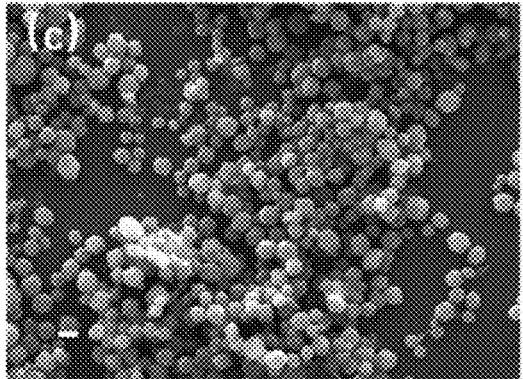
Figure 8D:
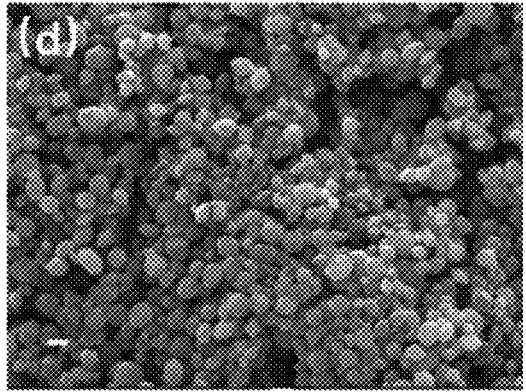
Figure 8E:
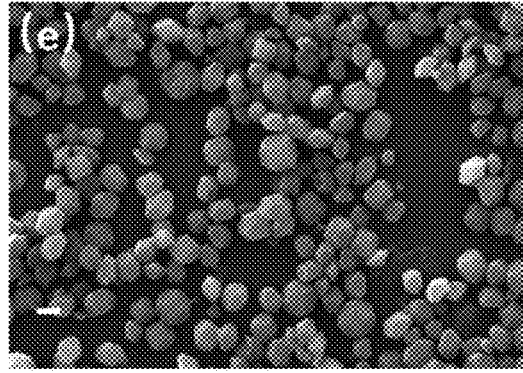
Figure 8F:
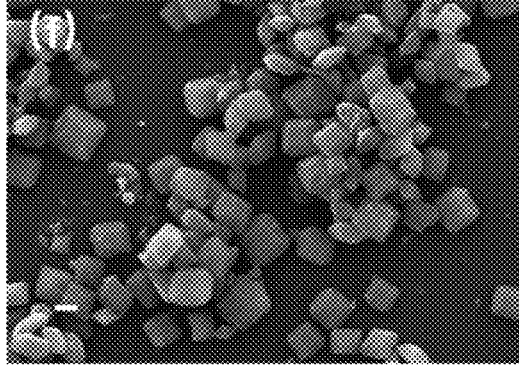
Figure 8G:
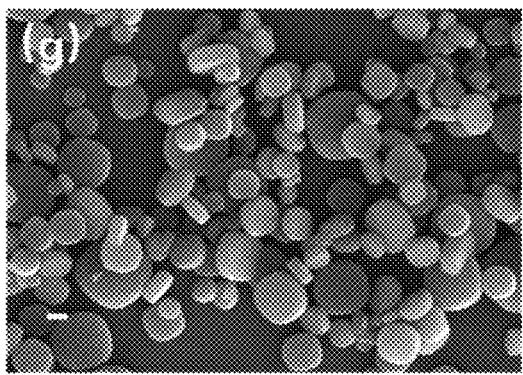
Figure 8H:
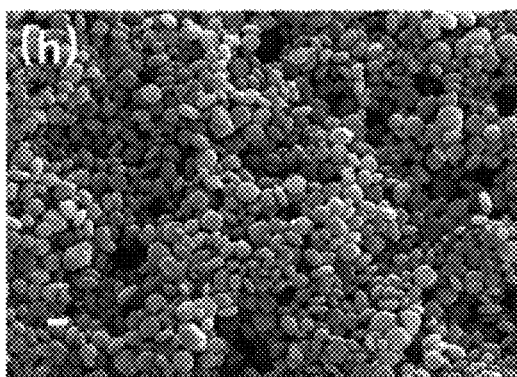

FIGS. 8A to 8H shows the SEM images of Comparative Example 2 (MIL-125-NH$_2$) (FIG. 8A), Example 1 (Ti-MOF-4) (FIG. 8B), Example 2 (Ti-MOF-2) (FIG. 8C), Example 3 (Ti-MOF-1) (FIG. 8D), Example 4 (Ti-MOF-0.5) (FIG. 8E), Example 5 (Ti-MOF-0.25) (FIG. 8F), Comparative Example 1 (MIL-125) (FIG. 8G) and Example 6 (Ti-MOF-1S) (FIG. 8H). Scale bar=1 µm.

Figure 9:
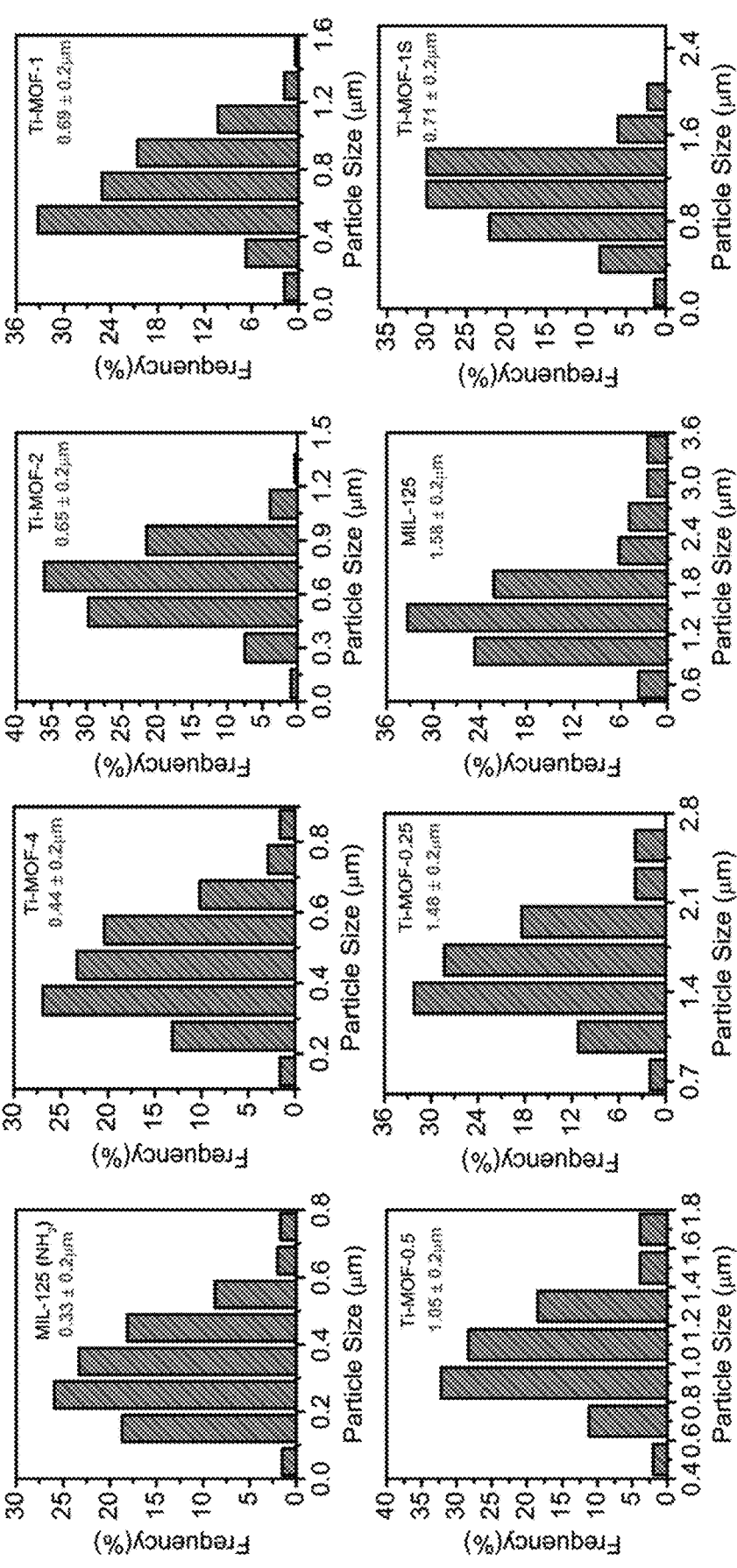
FIG. 9 shows the particle size distribution of Comparative Example 2 (MIL-125-NH$_2$) (a), Example 1 (Ti-MOF-4) (b), Example 2 (Ti-MOF-2) (c), Example 3 (Ti-MOF-1) (d), Example 4 (Ti-MOF-0.5) (e), Example 5 (Ti-MOF-0.25) (f), Comparative Example 1 (MIL-125) (g) and Example 6 (Ti-MOF-1S) (h).

FIG. 9 shows the particle size distribution of Comparative Example 2 (MIL-125-NH$_2$) (a), Example 1 (Ti-MOF-4) (b), Example 2 (Ti-MOF-2) (c), Example 3 (Ti-MOF-1) (d), Example 4 (Ti-MOF-0.5) (e), Example 5 (Ti-MOF-0.25) (f), Comparative Example 1 (MIL-125) (g) and Example 6 (Ti-MOF-1S) (h).

As seen from FIGS. 8A to 8H and 9, the particle size of the Ti-MOFs increased gradually with the increased molar ratio of $H_2BDC$ in the order of Comparative Example 2 (MIL-125-NH$_2$)<Example 1 (Ti-MOF-4)<Example 2 (Ti-MOF-2)<Example 3 (Ti-MOF-1)<Example 4(Ti-MOF-0.5)<Example 5(Ti-MOF-0.25)<Comparative Example 1 (MIL-125). Through this, it was confirmed that particle size can be controlled variously with the nuclear concentration gradient of the MOF, which determines the growth rate thereof. In addition, it was confirmed that the amino group (—NH$_2$) can provide more electrons to increase the rate of the deprotonation of the carboxyl group (—COON) in the organic linker, and that the stronger coordination ability of $NH_2$—$H_2BDC$ accelerates the nucleation process, leading to formation of smaller particles.

Figure 10A:
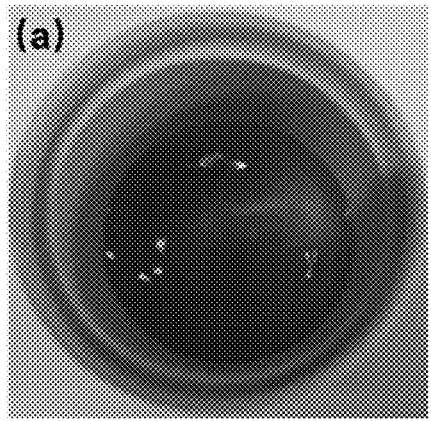
FIGS. 10A to 10F show the images of precursor solutions (FIGS. 10A to 10C) and the solutions after stirring for 1 hour and before heat treatment (FIGS. 10D to 10F) of Comparative Example 2 (MIL-125-NH$_2$) (FIGS. 10A and 10D), Example 3 (Ti-MOF-1) (FIGS. 10B and 10E) and Comparative Example 1 (MIL-125) (FIGS. 10C and 10F).
Figure 10B:
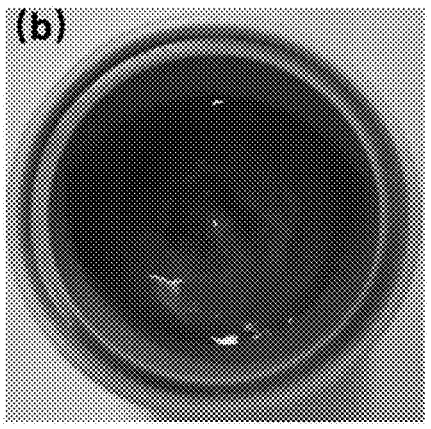
Figure 10C:
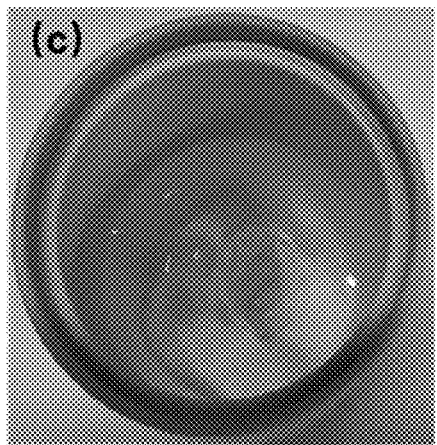
Figure 10D:
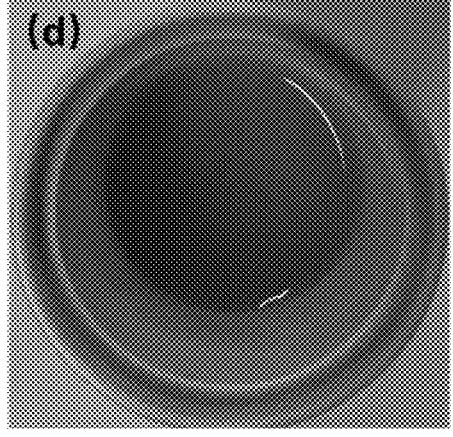
Figure 10E:
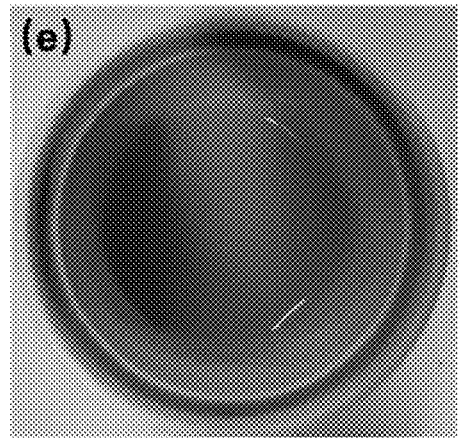
Figure 10F:
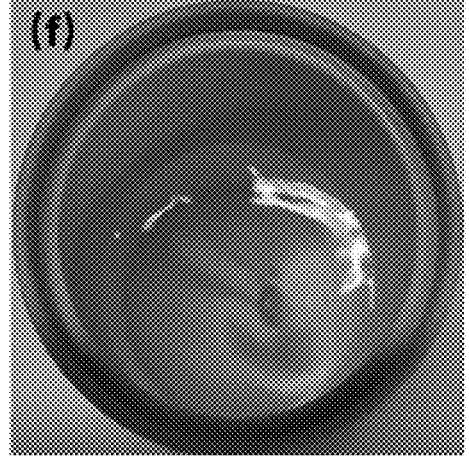

FIGS. 10A to 10F show the images of the precursor solutions (FIGS. 10A to 10C) and the solutions after stirring for 1 hour and before heat treatment (FIGS. 10D to 10F) of Comparative Example 2 (MIL-125-NH$_2$) (FIGS. 10A and 10D), Example 3 (Ti-MOF-1) (FIGS. 10B and 10E) and Comparative Example 1 (MIL-125) (FIGS. 10C and 10F). Referring to FIGS. 10A to 10F, it can be seen that yellow precipitate was formed during stirring in the presence of the $NH_2$—$H_2BDC$ linker, indicating that competitive coordination occurred. Therefore, it was confirmed that the formation of missing linker defects was due to the competitive coordination bonding during the nucleation step.

Test Example 5: Analysis of Ti-MOFs Before and After Ultrasonic Pretreatment In order to investigate why missing linker defects are formed through competitive coordination bonding for the Ti-MOFs prepared in Examples 1-6 and Comparative Examples 1 and 2, the precursor solution of Example 3 (Ti-MOF-1) was compared with the ultrasonically pretreated solution of Example 6 (Ti-MOF-1S). The result is shown in FIGS. 11-14.

FIGS. 11A to 11F show the N$_2$ adsorption-desorption isotherm (FIG. 11A), pore size distribution (FIG. 11B), SEM image (FIG. 11C), TEM image (FIG. 11D), XRD result (FIG. 11E) and TGA result (FIG. 11F) of Example 6 (Ti-MOF-1S). Referring to FIGS. 11A to 11F, it was confirmed that only the microporous structure was observed for Example 6 (Ti-MOF-1S) despite the presence of the mixed linkers.

Figure 12A:
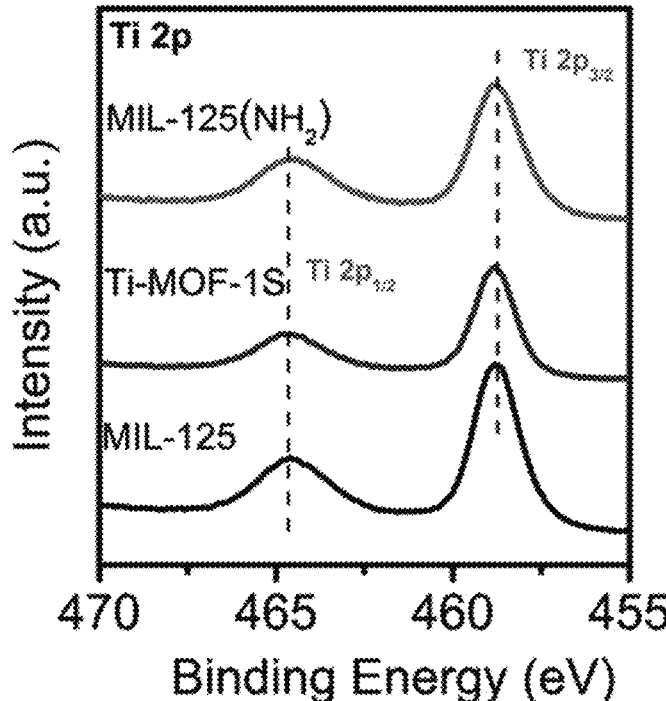
FIGS. 12A and 12B show the XPS result of Example 6 (Ti-MOF-1S) and Comparative Examples 1 and 2.
Figure 12B:
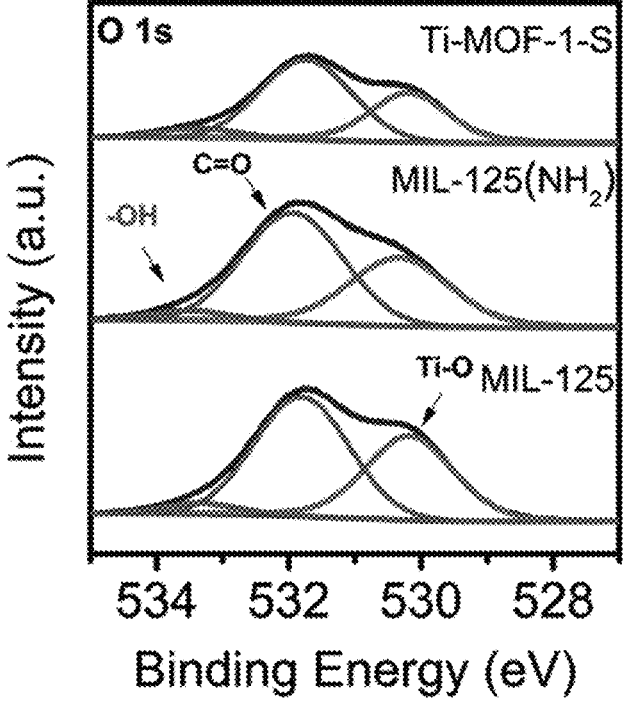

FIGS. 12A and 12B show the XPS result of Example 6 (Ti-MOF-1S) and Comparative Examples 1 and 2.

Figure 13A:
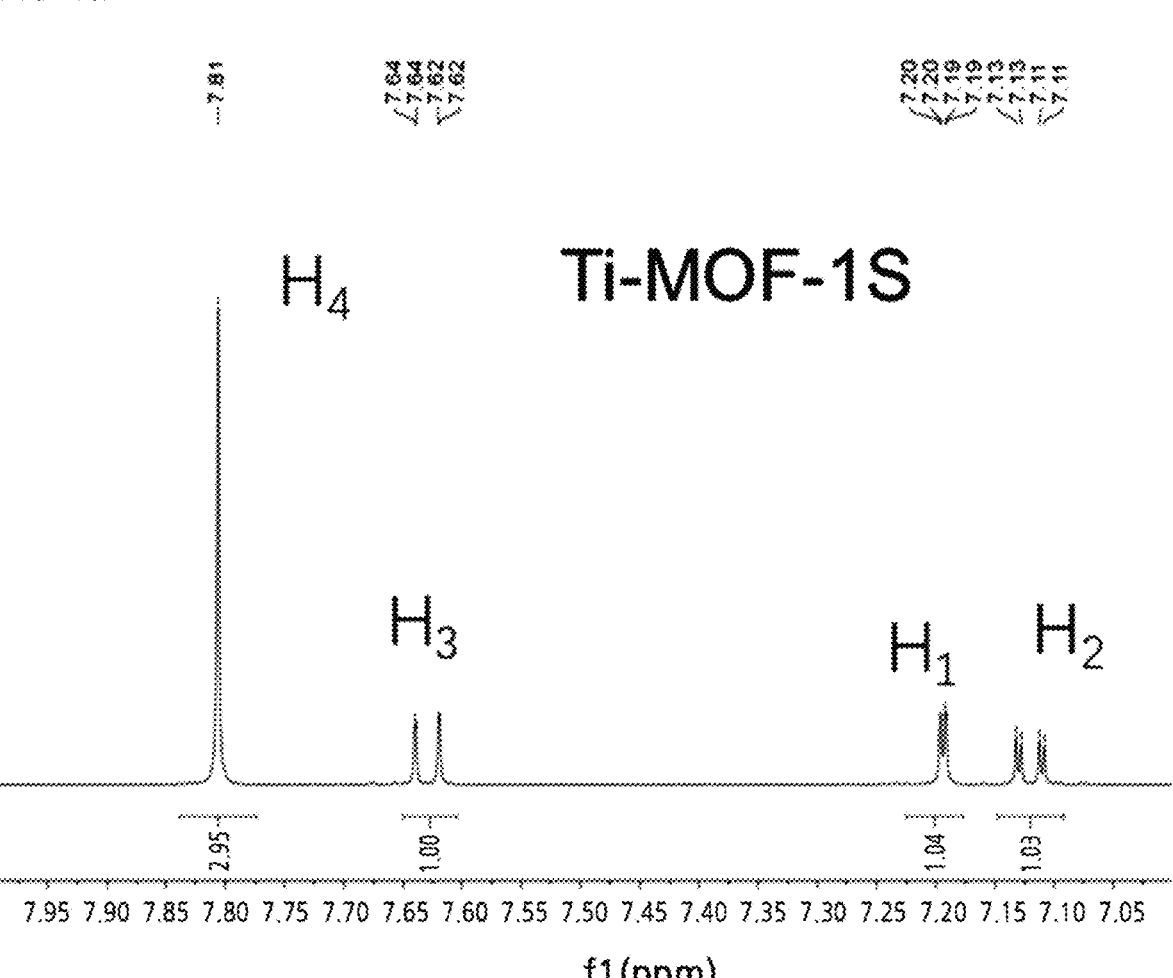
FIGS. 13A and 13B show the $^1$H NMR spectra of Example 3 (Ti-MOF-1) and Example 6 (Ti-MOF-1S).
Figure 13B:
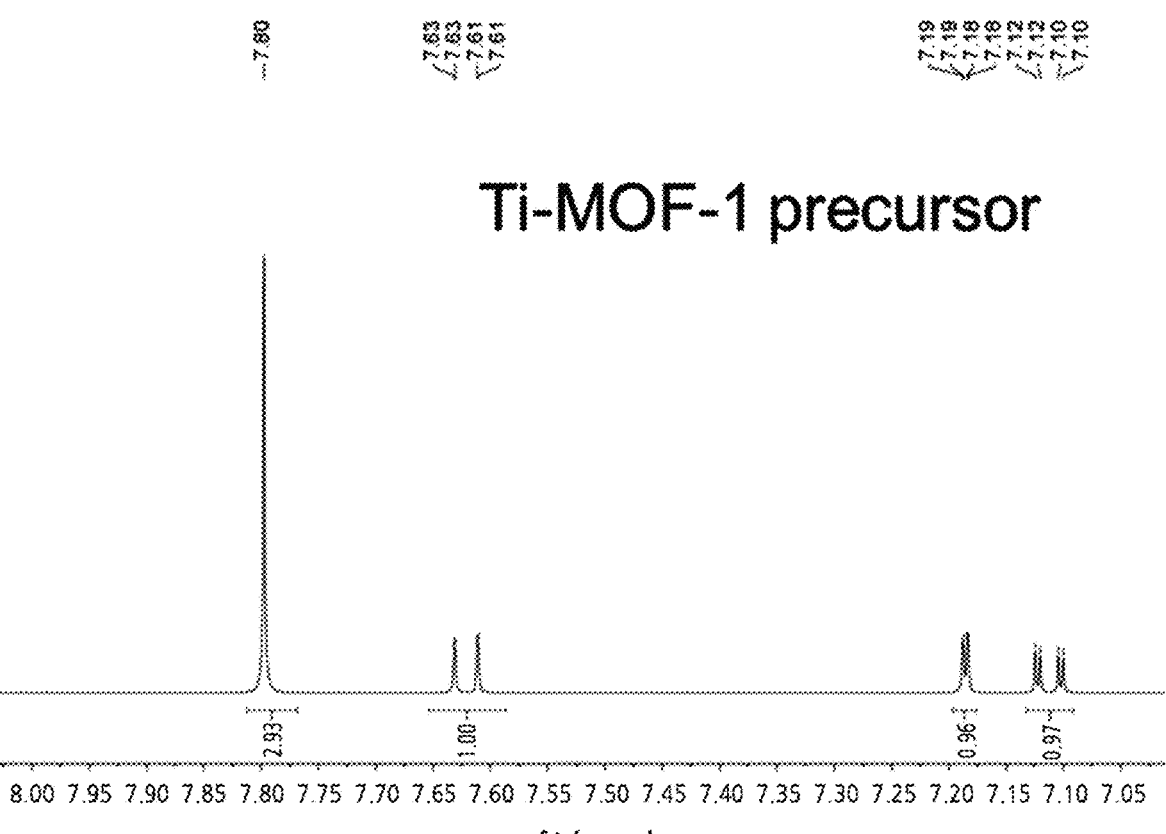

FIGS. 13A and 13B show the $^1$H NMR spectra of Example 3 (Ti-MOF-1) and Example 6 (Ti-MOF-1S).

Figure 11A:
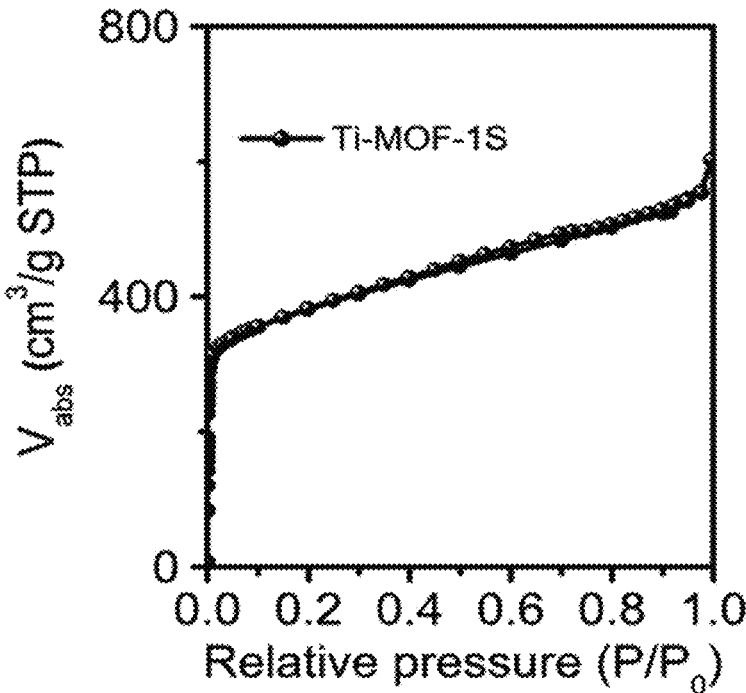
FIGS. 11A to 11F show the N$_2$ adsorption-desorption isotherm (FIG. 11A), pore size distribution (FIG. 11B), SEM image (FIG. 11C), TEM image (FIG. 11D), XRD result (FIG. 11E) and TGA result (FIG. 11F) of Example 6 (Ti-MOF-1S).
Figure 11B:
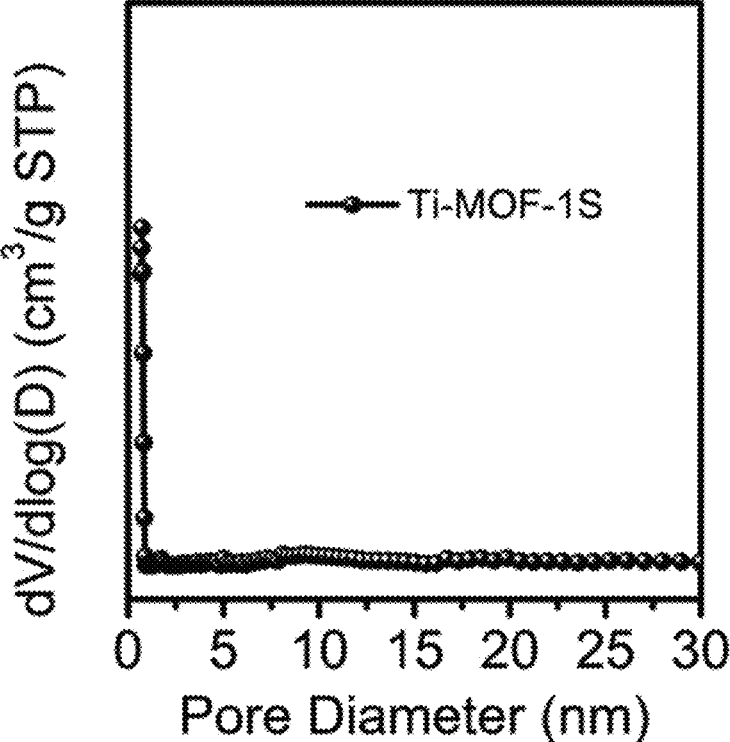
Figure 11C:
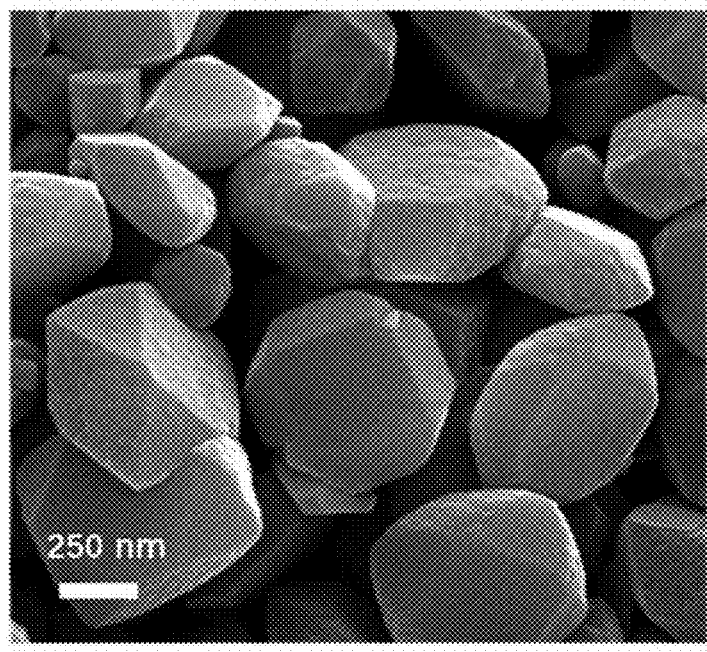
Figure 11D:
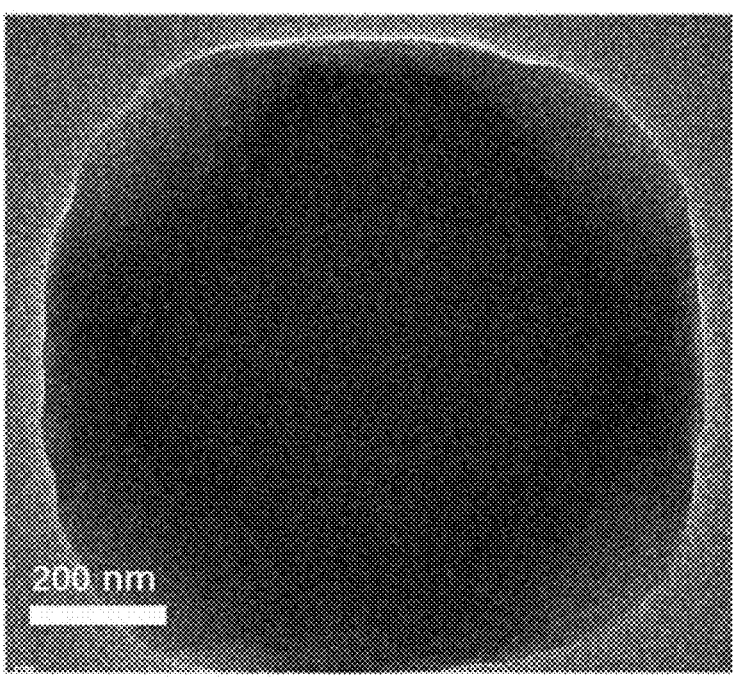
Figure 11E:
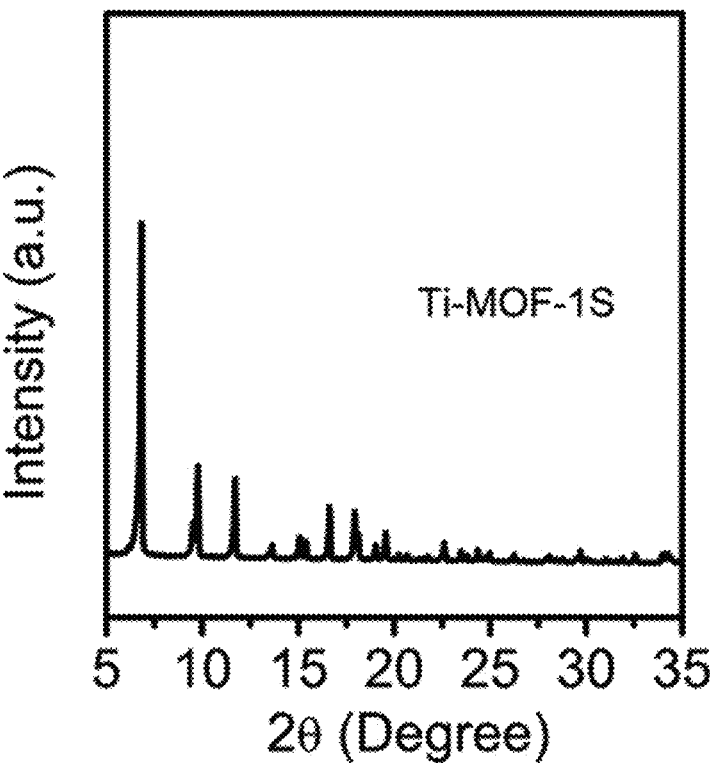
Figure 11F:
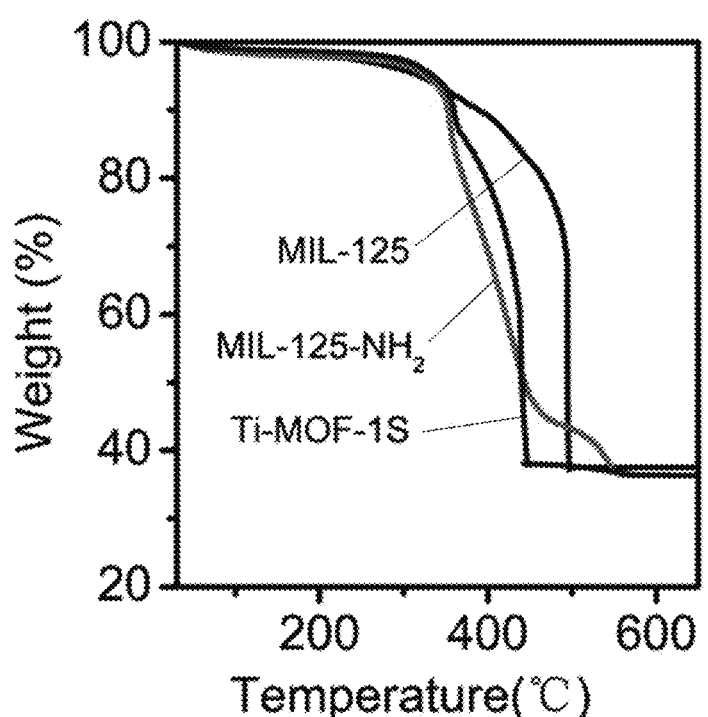

FIG. 11E shows that the crystal structure of Example 6 (Ti-MOF-1S) is identical to that of Comparative Example 1 (MIL-125). In addition, the results of TGA, XPS and $^1$H NMR (FIGS. 11-13) and ICP-OES (Table 4) show that the missing of $BDC^{2-}$ can be significantly inhibited by ultrasonic treatment in short time. These analysis results show that competitive coordination bonding is the predominant factor in the formation of hierarchical pore structure.

In order to further investigate the formation of missing linker defects, the precipitation of the precursor of Example 3 (Ti-MOF-1) before ultrasonic treatment was analyzed by SEM.

Figure 14:
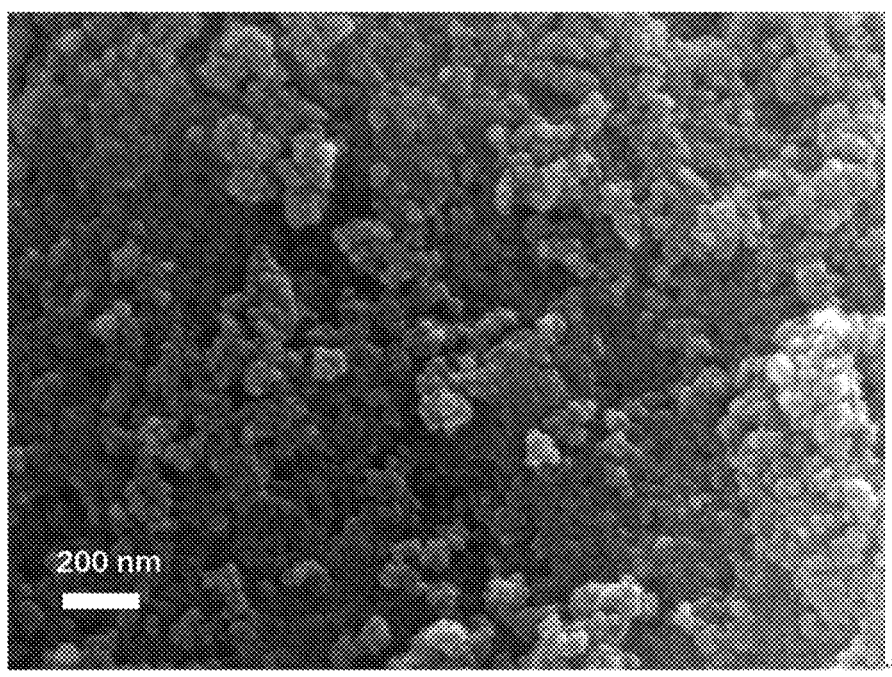
FIG. 14 shows the SEM image of a Ti-MOF-1 precursor of Example 3.

FIG. 14 shows the SEM image of the Ti-MOF-1 precursor of Example 3. Referring to FIG. 14, it can be seen that the Ti-MOF-1 precursor is composed of nanosized primary particles that can serve as building units for constituting the MOF. In addition, as can be seen from FIG. 13B and Table 3, for the Ti-MOF-1 precursor, because the intermolecular hydrogen boding between the —NH$_2$ and —COON functional groups in NH$_2$BDC delays further nucleation and induces coordination bonding, some of H$_2$BDC was coordination bonded to Ti$^{4+}$ clusters.

It is to be noted that the content of $BDC^{2-}$ in the Ti-MOF-1 precursor is close to that of Example 6 (Ti-MOF-1-S) and is much higher than that of Example 3 (Ti-MOF-1). However, because uncoordinated H$_2$BDC should be normally dissolved in the solvent and removed by centrifugation, the content of $BDC^{2-}$ in the Ti-MOF-1 precursor should be lower than that of Example 6 (Ti-MOF-1-S). The $^1$H NMR analysis result showed that some of the uncoordinated H$_2$BDC was adsorbed in the cavity of the Ti-MOF-1 precursor without being coordinated to the Ti—O clusters. That is to say, the content of $BDC^{2-}$ in the Ti-MOF-1 precursor was higher than that of Example 3 (Ti-MOF-1) due to the adsorption in the cavity and thus the missing linker defects dominated hierarchical pore structure could be formed.

Test Example 6: Analysis of UV-vis Absorption, VB-XPS and XRD of Ti-MOFs

UV-vis absorption, VB-XPS and XRD analyses were performed for the Ti-MOFs prepared in Examples 1-6 and Comparative Examples 1 and 2. The result is shown in FIGS. 15A to 15B and 16.

Figure 15A:
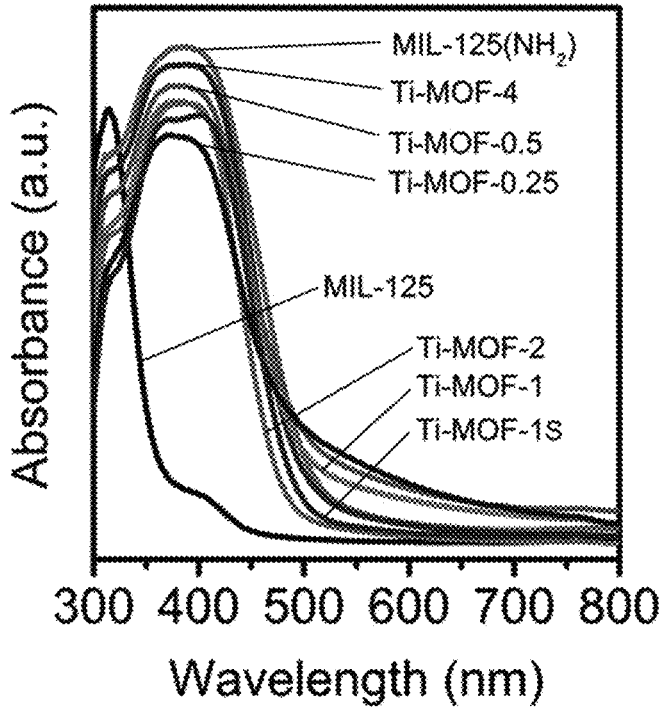
FIGS. 15A and 15B show the UV-vis diffuse reflectance spectra (FIG. 15A) and Tauc plots for calculation of bandgap (FIG. 15B) of Ti-MOFs prepared in Examples 1-6 and Comparative Examples 1 and 2.
Figure 15B:
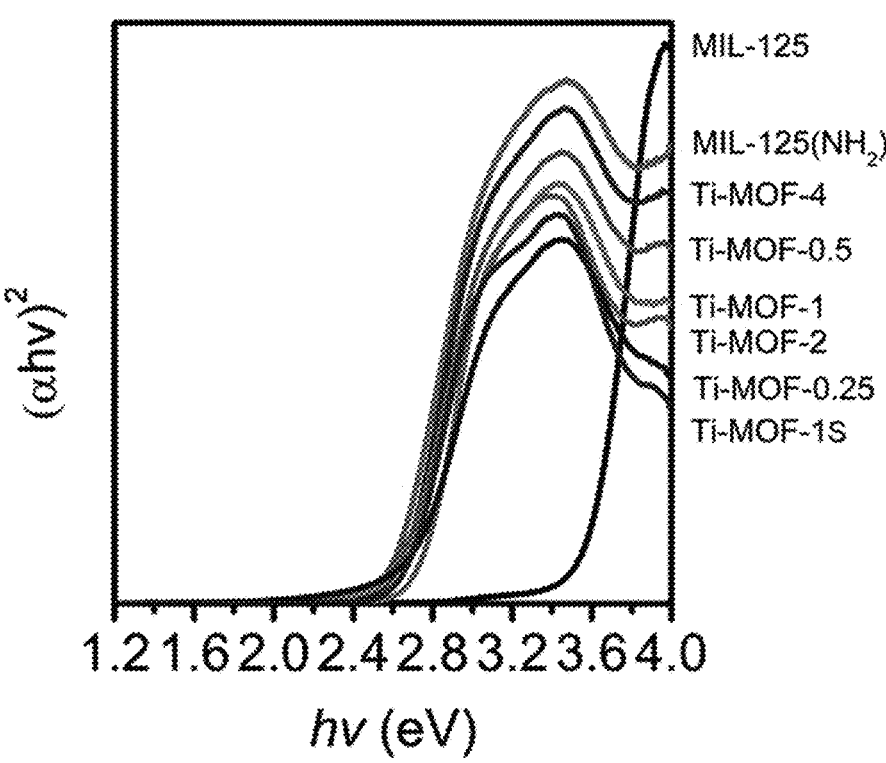

FIGS. 15A and 15B show the UV-vis diffuse reflectance spectra (FIG. 15A) and Tauc plots for calculation of bandgap (FIG. 15B) of the Ti-MOFs prepared in Examples 1-6 and Comparative Examples 1 and 2.

FIG. 16 shows the VB-XPS spectra for identifying the bandgap structure of the Ti-MOFs prepared in Examples 1-6 and Comparative Examples 1 and 2.

Referring to FIGS. 15A, 15B and 16, whereas Comparative Example 1 (MIL-125) has an absorption edge near 330 nm, the absorption edge of Comparative Example 2 (MIL-125-NH$_2$) was shifted to 530 nm, because the amine functional group (—NH$_2$), as a typical chromophore, can provide more conjugated π electrons to Ti-oxo clusters. As a result, the light absorption by the Ti-MOF-x of Examples 1-5 in the presence of —NH$_2$ was similar to the light absorption by Comparative Example 2 (MIL-125-NH$_2$).

Table 5 shows the bandgap measured from FIG. 15B.

TABLE 5

|  | Bandgap (eV) |
| --- | --- |
| Comp. Ex. 1 (ML-125) | 3.57 |
| Ex. 5 (Ti-MOF-0.25) | 2.72 |
| Ex. 4 (Ti-MOF-0.5) | 2.67 |
| Ex. 6 (Ti-MOF-1S) | 2.67 |
| Ex. 3 (Ti-MOF-1) | 2.65 |
| Ex. 2 (Ti-MOF-2) | 2.63 |
| Ex. 1 (Ti-MOF-4) | 2.64 |
| Comp. Ex. 2 (ML-125(NH$_2$)) | 2.58 |

As seen from Table 5, the bandgap of Ti-MOF-x of Examples 1-6 was between those of Comparative Example 1 (MIL-125) and Comparative Example 2 (MIL-125-NH$_2$). In addition, the bandgap, which is a function of x, was decreased gradually, which is attributable to the strong electron-donating ability of the aromatic amine.

Test Example 7: Analysis of VOC Photodegradation and Charge-Discharge Performance of Ti-MOFs In order to investigate the adsorption and photocatalytic performance of the Ti-MOFs prepared in Examples 1-6 and Comparative Examples 1 and 2, VOC (toluene) photodegradation and charge-discharge characteristics were analyzed. The result is shown in FIGS. 16A to 16F and 18.

Figure 16A:
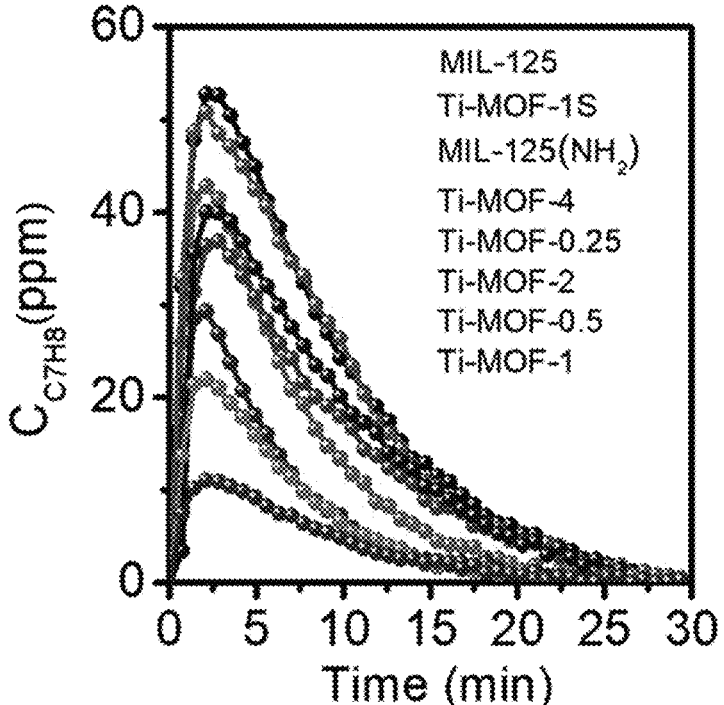
FIGS. 16A to 16F show the adsorption (FIG. 16A), photodegradation (FIG. 16B) and toluene degradation rate (FIG. 16C) of Ti-MOFs prepared in Examples 1-6 and Comparative Examples 1 and 2, the recycling degradation curve of Example 3 (FIG. 16D), and transient photocurrent response (FIG. 16E) and Nyquist impedance plots (FIG. 16F).
Figure 16B:
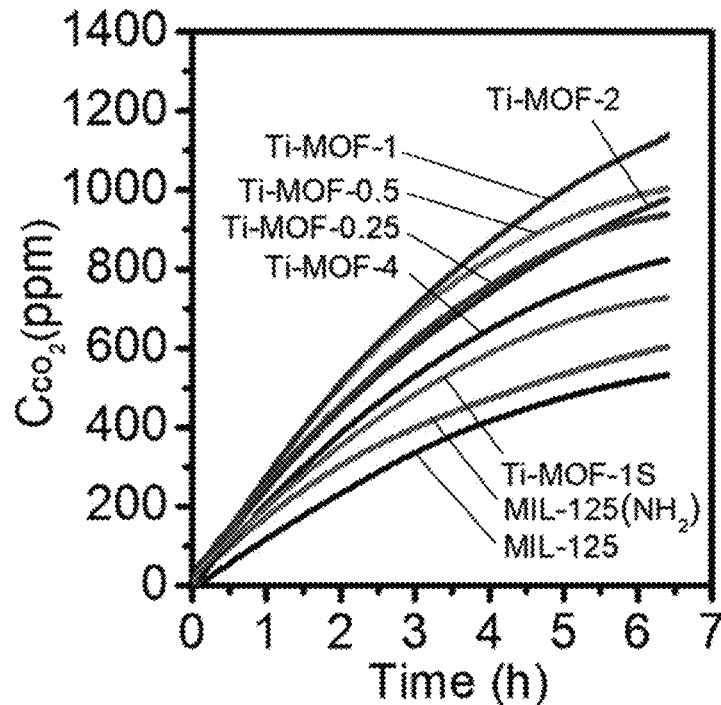
Figure 16C:
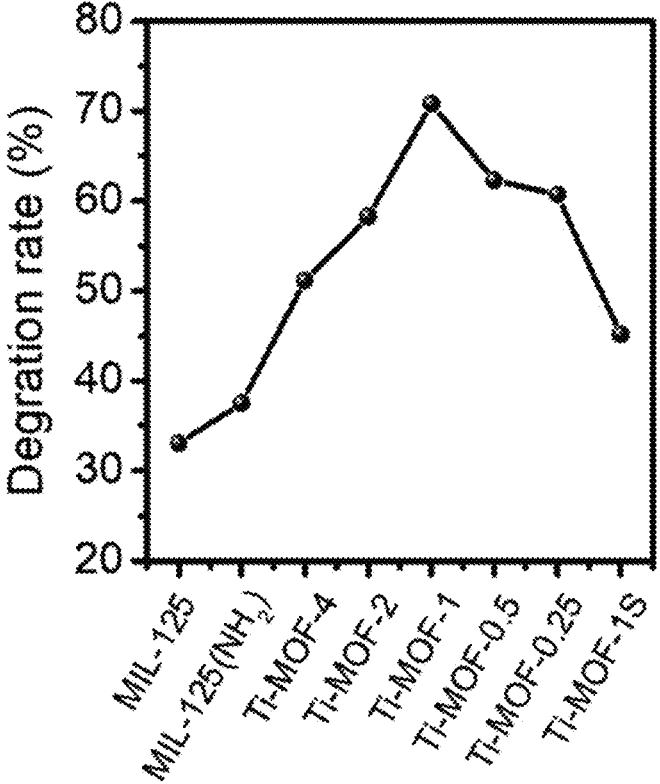
Figure 16D:
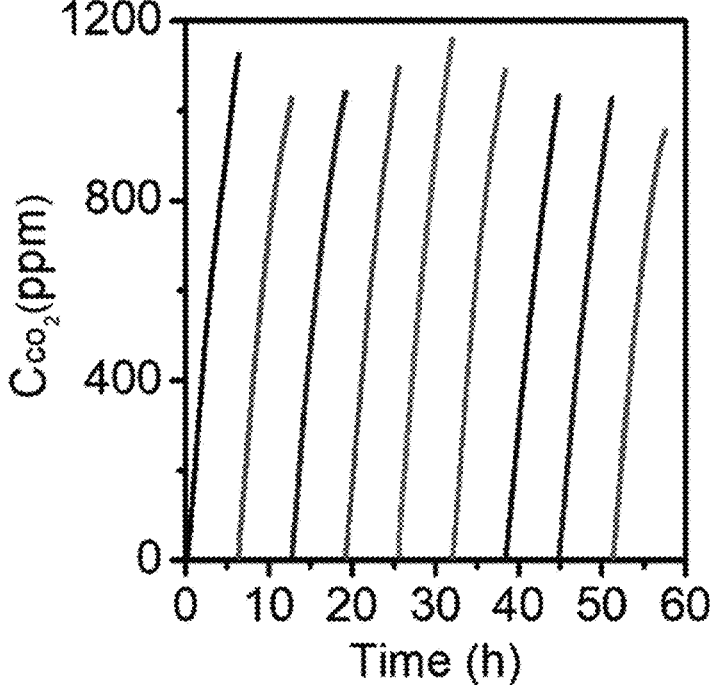
Figure 16E:
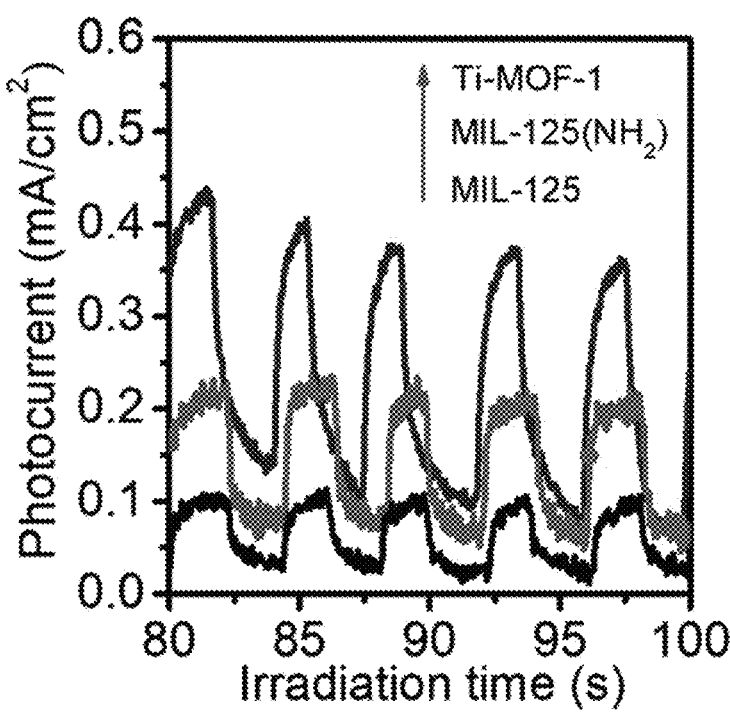
Figure 16F:
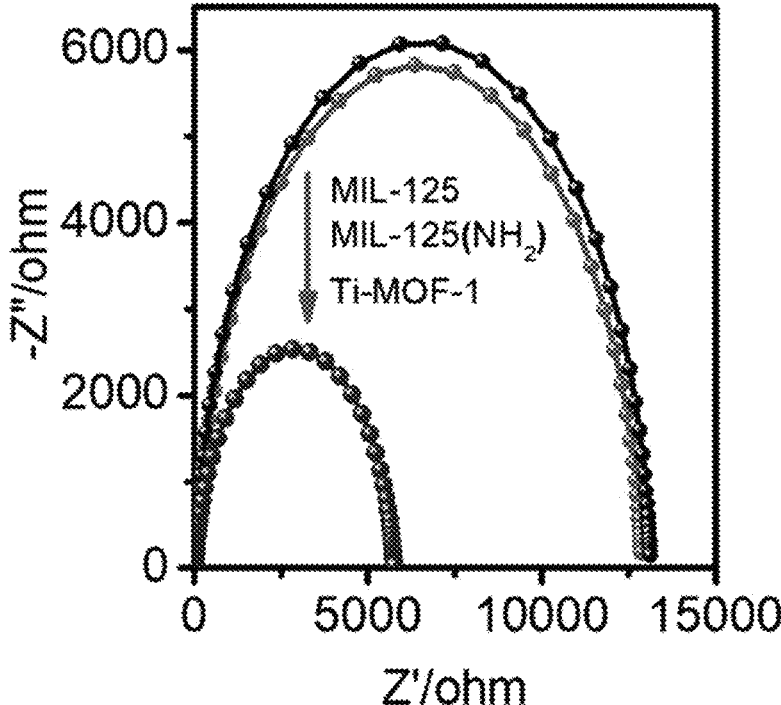

FIGS. 16A to 16F show the adsorption (FIG. 16A), photodegradation (FIG. 16B) and toluene degradation rate (FIG. 16C) of the Ti-MOFs prepared in Examples 1-6 and Comparative Examples 1 and 2, the recycling degradation curve of Example 3 (FIG. 16D), and transient photocurrent response (FIG. 16E) and Nyquist impedance plots (FIG. 16F).

Referring to FIG. 16A, toluene volatilized quickly and reached the maximum concentration of 53 ppm for Comparative Example 1 (MIL-125), 43 ppm for Comparative Example 2 (MIL-125-NH$_2$), 51 ppm for Example 6 (Ti-MOF-1S), 40.2 ppm for Example 1 (Ti-MOF-4), 37 ppm for Example 2 (Ti-MOF-2), 11.26 ppm for Example 3 (Ti-MOF-1), 22.03 ppm for Example 4 (Ti-MOF-0.5) and 29.58 ppm for Example 5 (Ti-MOF-0.25) within 1-2 minutes.

In particular, it was confirmed that the microporous and mesoporous networks allow easier access and diffusion of gas molecules. Therefore, Example 3 (Ti-MOF-1) is considered optimal for toluene adsorption via control of porosity since the maximum concentration was reached fastest.

FIGS. 16B and 16C show a result of investigating the effect of the hierarchical structure and optical characteristics by performing photocatalytic degradation after adsorption equilibrium within 30 minutes. The degradation product CO$_2$ can be regarded as a convincing indicator for evaluating photocatalytic activity because the same amount of toluene was absorbed. Under solar irradiation (100 mW/cm$^2$), the CO$_2$ concentration was increased with time, confirming that toluene was photodegraded. Example 3 (Ti-MOF-1) showed the highest performance as 70.8%, which was 2.14 higher than that of Comparative Example 1 (MIL-125) (33.05%) and 1.89 times higher than that of Comparative Example 2 (MIL-125-NH$_2$) (37.49%). It was confirmed that, although Comparative Example 2 (MIL-125-NH$_2$) and Example 3 (Ti-MOF-1) have similar bandgaps, Example 3 (Ti-MOF-1) show higher photocatalytic activity for toluene degradation.

FIG. 16D shows a result of repeating toluene adsorption and photodegradation continuously for 9 cycles using Example 3 (Ti-MOF-1) within 60 hours. The recycling experiment indicated good long-term durability because the similar degradation rate was achieved.

FIG. 16E and 16F show a result of performing transient photocurrent response and electrochemical impedance spectroscopy (EIS) to determine the photogenerated charge separation efficiency of Comparative Example 1 (MIL-125), Comparative Example 2 (MIL-125-NH$_2$) and Example 3 (Ti-MOF-1). Example 3 (Ti-MOF-1) showed the highest transient photocurrent density and the smallest radius, suggesting the fastest photogenerated electron-hole separation ability and the lowest charge transfer resistance, which was due to the missing linkers.

Figure 17A:
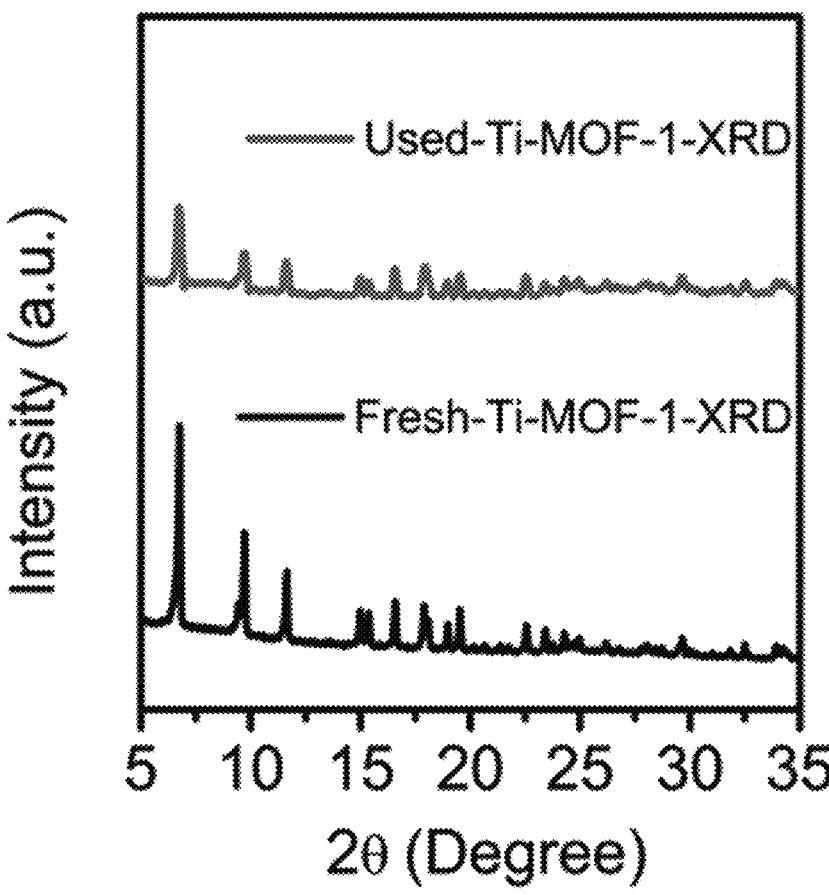
FIGS. 17A and 17B show the XRD pattern after charge and discharge for 9 cycles (FIG. 17A) and the SEM image (FIG. 17B) of Ti-MOF-1 prepared in Example 3.
Figure 17B:
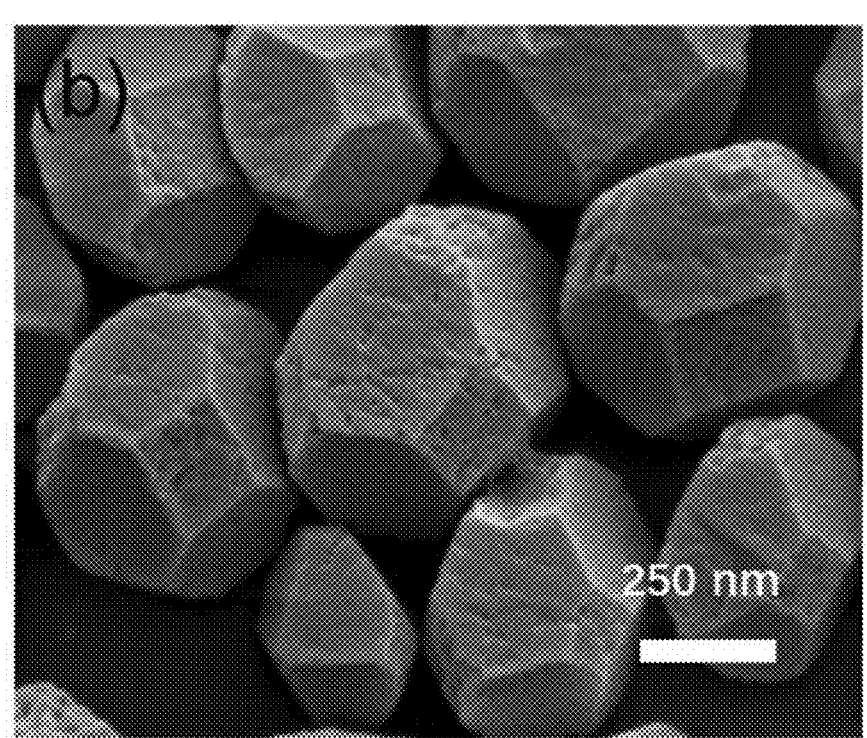

FIGS. 17A and 17B show the XRD pattern after charge and discharge for 9 cycles (FIG. 17A) and the SEM image (FIG. 17B) of the Ti-MOF-1 prepared in Example 3. Referring to FIGS. 17A and 18B, Example 3 (Ti-MOF-1) showed slightly decreased crystallinity and stable hierarchical pore structure.

As described above, the hierarchical pore structure of Ti-MOF could be controlled via competitive coordination of linkers. The hierarchical pore structure was formed by missing linkers due to the adsorption of uncoordinated BDC$^{2-}$. The pore size distribution of the obtained Ti-MOF-x could be controlled by adjusting the molar ratio of H$_2$BDC and NH$_2$—H$_2$BDC. The bandgap was optimized by the organic linker with chromophores (—NH$_2$). In particular, Example 3 (Ti-MOF-1) showed the best performance in terms of adsorption and charge separation for photocatalytic degradation of toluene.

What is claimed is:

1. A method for preparing a titanium-organic framework photocatalyst for adsorption and decomposition of a volatile organic compound, comprising:

a step of preparing a mixture solution by mixing a first carboxylic acid compound and a second carboxylic acid compound in an organic solvent;

a step of preparing a reactant by mixing a titanium precursor in the mixture solution; and a step of preparing a titanium-organic framework photocatalyst by reacting the reactant at 130-180° C. for 18-30 hours, wherein the first carboxylic acid compound and the second carboxylic acid compound are mixed at a molar ratio of 2:1-1:2 in the mixture solution;

wherein:

the organic solvent is N,N-dimethylformamide (DMF)

the first carboxylic acid compound is amino-1,4-benzenedicarboxylic acid, the second carboxylic acid compound is 1,4-benzenedicarboxylic acid, the titanium precursor is titanium isopropoxide, the titanium is comprised in an amount of 26-28 wt % based on 100 wt % of the titanium-organic framework photocatalyst, the titanium-organic framework photocatalyst has a hierarchical pore structure with an average pore size of 5-10 nm and a Brunauer-Emmett-Teller specific surface area of 610-623 m$^2$/g, the titanium-organic framework photocatalyst has a polyhedral shape with (001), (110) and (111) crystal planes and an average particle size of 0.6-0.7 μm, the titanium-organic framework photocatalyst exhibits a C=O peak (P1) and a O—H peak (P2) at 531.5-532 eV and 533-534 eV upon X-ray photoelectron spectroscopy (XPS), and the titanium-organic framework photocatalyst has a bandgap energy of 2.33-2.40 eV.

2. A titanium organic framework photocatalyst for adsorption and decomposition of a volatile organic compound produced by the method of claim 1, wherein the volatile organic compound that is adsorbed and decomposed is one or more selected from a group consisting of toluene, an aldehyde, ketone, benzene, ethylbenzene, xylene and a chlorohydrocarbon.

3. The method of claim 1, wherein the step of preparing the titanium-organic framework photocatalyst comprises reacting the reactant at 140-160° C. for 22-26 hours.

4. The method of claim 1, wherein the first carboxylic acid compound and the second carboxylic acid compound are mixed at a molar ratio of 1:1.

* * * * *